United States Patent
Burchfiel

(10) Patent No.: US 8,190,093 B2
(45) Date of Patent: May 29, 2012

(54) SPECTRUM ADAPTIVE NETWORKING

(75) Inventor: Jerry D. Burchfiel, Waltham, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 13/234,868

(22) Filed: Sep. 16, 2011

(65) Prior Publication Data
US 2012/0064928 A1    Mar. 15, 2012

Related U.S. Application Data

(62) Division of application No. 12/347,803, filed on Dec. 31, 2008, now Pat. No. 8,041,363, which is a division of application No. 10/689,763, filed on Oct. 22, 2003, now Pat. No. 7,483,711.

(60) Provisional application No. 60/420,930, filed on Oct. 24, 2002.

(51) Int. Cl.
H04B 1/00  (2006.01)
H04B 15/00  (2006.01)

(52) U.S. Cl. .................... 455/63.1; 455/450; 455/452.1; 455/452.2; 455/500; 455/502; 455/507; 455/509; 455/513; 455/522; 455/561; 455/41.2; 370/328; 370/329; 370/330; 375/132; 375/133

(58) Field of Classification Search ............. 455/450, 455/452.1, 452.2, 500–503, 507–516, 41.2, 455/63.1, 63.3, 67.11, 67.13, 522, 561, 445–448; 370/229, 237–238, 328–333, 445, 447, 448; 375/132, 133
See application file for complete search history.

(56) References Cited

U.S. PATENT DOCUMENTS

| | | | |
|---|---|---|---|
| 5,767,807 A | 6/1998 | Pritchett | |
| 6,141,335 A | 10/2000 | Kuwahara et al. | |
| 6,246,713 B1 * | 6/2001 | Mattisson | 375/132 |
| 6,590,928 B1 * | 7/2003 | Haartsen | 375/134 |
| 6,731,939 B1 * | 5/2004 | Watanabe et al. | 455/450 |
| 6,826,409 B2 * | 11/2004 | Kostic et al. | 455/501 |
| 6,901,064 B2 | 5/2005 | Cain et al. | |

(Continued)

OTHER PUBLICATIONS

Notice of Proposed Rulemaking in Revision of Parts 2 and 15 of the Commission's Rules to Permit Unlicensed National Information Infrastructure (U-NII) devices in the 5 GHz band Before the Federal Comminications commission, Doc. No. 03-122 RM—10371, FCC 03-110 1-28 (Jun. 4, 2003).

(Continued)

Primary Examiner — Tuan A Tran
(74) Attorney, Agent, or Firm — Ropes & Gray LLP

(57) ABSTRACT

The present invention increases the available spectrum in a wireless network by sharing existing allocated (and in-use) portions of the RF spectrum in a manner that will minimize the probability of interfering with existing legacy users. The invention provides interference temperature-adaptive waveforms, and a variety of physical and media access control protocols for generating waveforms based on measurement and characterization of the local spectrum. The invention measures the local spectrum at a receiving node, generates an optimal waveform profile specifying transmission parameters that will water-fill unused spectrum up to an interference limit without causing harmful interference to primary and legacy transmitters using the same frequency bands, and enables simultaneous transmit and receive modes at a multiplicity of transceivers in a wireless network. The invention also provides closed loop feedback control between nodes, co-site interference management, intersymbol interference mitigation, wide sense stationary baseband signaling and modulation, and power limited signaling for avoiding detection and interception.

40 Claims, 19 Drawing Sheets

U.S. PATENT DOCUMENTS

| | | |
|---|---|---|
| 6,904,032 B2 | 6/2005 | Cain |
| 6,920,171 B2 * | 7/2005 | Souissi et al. ............... 375/133 |
| 7,136,663 B2 * | 11/2006 | Metais et al. ............... 455/509 |
| 7,162,260 B2 * | 1/2007 | Shoji et al. ............... 455/507 |
| 7,194,017 B2 * | 3/2007 | Hervey et al. ............... 375/132 |
| 7,305,004 B2 * | 12/2007 | Sherman ............... 370/462 |
| 7,430,435 B2 * | 9/2008 | Choi et al. ............... 455/522 |
| 7,483,711 B2 | 1/2009 | Burchfiel |
| 2001/0045914 A1 | 11/2001 | Bunker |
| 2002/0022484 A1 | 2/2002 | Dickey |
| 2002/0022495 A1 | 2/2002 | Choi et al. |

OTHER PUBLICATIONS

Li Ping et al., Low-Rate Turbo-Hadamard Codes 1, 1-38, (unpublished manuscript, on file with the Department of Electronic engineering, City University of Hong Kong).

Spectrum Policy Task Force Report, Federal Communications Commission, ET doc. No. 02-135 (Nov. 2002).

* cited by examiner

SPECTRUM ADAPTIVE NETWORKING

RELATED APPLICATIONS

This application is a divisional of U.S. application Ser. No. 12/347,803, filed Dec. 31, 2008, which is a divisional of U.S. application Ser. No. 10/689,763, filed Oct. 22, 2003, now U.S. Pat. No. 7,483,711, which claims priority under 35 U.S.C. §119 to provisional Application No. 60/420,930, filed Oct. 24, 2002, the entirety of which is incorporated herein by reference.

BACKGROUND OF THE INVENTION

1. Field of the Invention

The present invention relates generally to radio frequency spectrum management systems, and, more particularly, to systems and methods for recovering and/or sharing radio frequency spectrum in radio frequency bands already populated by legacy users (such as cell phone users) and high-priority users (such as public safety, military and government entities) without exposing those legacy and high-priority users to harmful interference.

2. Description of the Related Art

Wireless communications network bandwidth continues to shrink at an alarming rate. Increasing demand for spectrum-based services and devices is putting a strain on long-standing and out-moded spectrum allocation and use policies. Managing interference levels among the rapidly increasing number of users has become extremely difficult because of the greater density, mobility and variability of "next generation" (XG) radio frequency emitters.

Current spectrum management policy seeks to assign locally unoccupied portions of the RF spectrum to XG users. The Federal Communications Commission ("FCC") Spectrum Management Policy Task Force has recommended adoption of a policy of "Interference Protection," which defines an acceptable level of interference to primary users from secondary users in terms of this interference temperature. Under the recommended policy, secondary users of a band are, required to accept interference from primary users, and must cause no "harmful" interference to the primary users. Thus, the policy permits secondary (e.g., unlicensed) users to radiate only enough power in an area of interest to raise the interference temperature in the band to a specified threshold $T_0$ for the band, service, and locality. The receivers of the primary (e.g., licensed) users are then expected to tolerate this specified level of interference. This proposed arrangement, if it is widely adopted, will create an opportunity to "underlay" existing primary applications with low-power, low-impact opportunistic applications that operate below the threshold.

While the Spectrum Policy Task Force Report recommends a new set of rules for spectrum use that in turn will provide a sound framework for using the available spectrum more efficiently, the report does not address many important and heretofore unanswered questions about how to build and configure networks and devices that comply with the new set of rules. Accordingly, what is needed are tools, devices and applications XG users can build, configure and deploy in order to take advantage of the proposed spectrum policies.

SUMMARY OF THE INVENTION

The present invention provides key enabling technology to implement the FCC's new flexible spectrum use policy. The invention addresses both individual spectrum management devices and provides an integrated system concept for dynamic, adaptive, radio frequency spectrum assignment and use. The result is far greater spectrum efficiency, providing megabit/sec rate communications networks that can extend far beyond the capabilities of existing wireless networking systems and devices. The invention provides a way to underlay new services on existing bandwidth allocations with minimal or no interference to, and from, existing legacy users, while providing up to 30 times greater throughput than the current systems.

To accomplish these goals, a node of a network communications system configured to operate in accordance with the present invention is configured to:

Continuously carry out real-time sensing and characterization of the local spectrum usage by (potentially interfering) narrowband and wideband emitters;

Dynamically and autonomously adapt (on a time scale of milliseconds) to the local spectrum environment by selecting and controlling the waveforms (power spectral density (PSD) and Media Access Control (MAC) protocols) that its network neighbors use when transmitting to this node;

Automatically carry out a closed loop power control algorithm with each neighbor to throttle back on unnecessarily high power levels, thereby enhancing Low Probability of Detection (LPD);

Apply transmission security ("TRANSEC") parameters to the spread spectrum modulation process in order to enhance Low Probability of Intercept (LPI); and Carry out packet forwarding (routing) in a way that balances aggregate network throughput against average end-to-end delay. (This results in real time traffic, e.g., voice, being sent with higher power, minimizing latency due to channel access delays at multiple hops, and bulk traffic being sent with lower power, minimizing network self-interference, maximizing spatial reuse of frequencies and enhancing LPI/LPD).

As described in detail below, the present invention also provides a highly advanced networking communications architecture for implementing the policies recommended by the FCC Task Force. The design of the architecture combines dynamic spectrum management techniques with matching adaptive networking and full exploitation of multiple transceivers per communications node. The invention also provides the flexibility and scalability, and may be easily adapted for use with other forward-looking wireless communications systems and technologies.

The present invention solves the "spectrum crisis" currently plaguing commercial, military, government and private users by providing a way to underlay spectrum-efficient megabit rate networking onto bands allocated for other purposes. The invention can thus be used, for example, to underlay military networking below any narrowband-channelized spectrum where individual channels have less than 100% duty cycle, such as in commercial cellular, without interfering with existing legacy users of these bands. Initial use of existing frequency allocations ensures that the invention may be implemented domestically without displacing or upsetting existing users. In overseas locations and in wartime, however, the invention is not restricted to these particular bands, and the flexible hardware and software made possible by the invention will also operate in other frequencies without hardware modification.

In general, the present invention provides a method for managing interference in a radio communications network, comprising the steps of: (1) receiving an aggregated radio signal at a first node in the radio communications network on a plurality of frequencies; (2) determining a power level for the aggregated radio signal for each frequency in the plurality frequencies; (3) subtracting the power level at each frequency from a power limit to produce a power differential for each frequency; and (4) instructing other nodes in the radio communications network to avoid using a transmission frequency corresponding to a non-positive power differential in the plurality of power differentials to transmit to the first node. A government agency, such as the FCC, an industry standards group, or other rule-making body may specify the power limit.

In preferred embodiments, the method further comprises the steps of: (5) receiving a transmission from a second node in the radio communications network; and (6) discarding any portion of the transmission carried on the transmission frequency the second node was instructed to avoid. Typically, although not necessarily, the discarding step is accomplished by applying an optimal matched filter to the transmission, said optimal matched filter being keyed to the instruction sent to the second node. By discarding a portion of the received transmission in this manner (the process is called receiver excision), interference produced by other emitters (e.g., legacy primary users) in the wireless environment is filtered out of the transmission.

The power level may be determined by acquiring a plurality of instantaneous power level measurements for each frequency and calculating an average power level based on the plurality of instantaneous power level measurements. This creates a "model" power level, of sorts, that may reflect a more accurate measure of the power levels present at the plurality of frequencies over a given period of time. Alternatively, the model power level also may be determined by calculating a median power level based on the plurality of instantaneous power level measurements.

In preferred embodiments, the method also includes closed loop power control. Each receiver sends to other nodes in the network a request to adjust (or limit) its transmission power level on frequencies corresponding to positive power differentials so that the receiver receives transmissions from all of its neighbors at the same power level. This feedback from each receiver in the network minimizes the transmit power on reliable links, maximizes the ability to achieve spatial separation among transmissions on the same frequency, and thereby minimizes network self-interference. Closed loop power control functionality also improves low probability of intercept (LPI) and low probability of detection (LPD), and minimizes battery drain for mobile and/or portable transmitting nodes.

In preferred embodiments of the invention, the aggregated signal is continuously monitored and the measured power level is continuously updated to account for the fact that some or all of the nodes may be mobile, and therefore constantly moving around, and new emitters (causing increased levels of interference) may come on line. Accordingly, each receiver in the network is preferably configured to provide constant, or at least fairly constant, updated instructions to its neighbors setting forth the optimal transmission parameters to use to transmit data to that receiver.

The optimal transmission parameters sent out to neighboring nodes by a receiver node may be embodied in an optimal waveform profile, which itself may contain information and instructions beyond power spectral density values. Such profile might also contain, for example, a schedule of optimal times to transmit information to the receiving node.

In some embodiments, it may be advantageous, desirable or necessary to compress the optimal waveform profile prior to transmitting it to a neighboring node. It may also be advantageous to specify a particular waveform pattern so that the receiving node will be able to determine from which node the waveform came.

In another aspect of the invention, another method for managing interference in a radio communications network, is provided, comprising the steps of: (1) receiving at a first node in the radio communications network an instruction transmitted from a second node to avoid using a plurality of frequencies to transmit to the second node; (2) filtering a transmission signal to remove power at frequencies that should be avoided; and (3) transmitting the filtered transmission signal to the second node. As before, the instruction may be embodied in or combined with an optimal waveform profile from the second node, the optimal waveform profile being based on a plurality of power measurements for a plurality of frequencies, as measured from the second node, and the power limit. In this aspect of the invention, the method may also include the step of decompressing the optimal waveform profile prior to generating a transmission signal conforming to the profile.

In still another aspect, the invention provides a method of managing interference in a radio communications network having a multiplicity of nodes, each node in the multiplicity having attached thereto a set of antennas oriented to face directions relative to other antennas attached to the node. This method comprises the steps of: (1) dividing the multiplicity of nodes into a plurality of node clusters; (2) assigning a unique receiving frequency to each node in a node cluster; and (3) assigning a unique transmission frequency to each antenna in the set of antennas attached to a first node in the node cluster; wherein the unique transmission frequency assigned to each antenna is equivalent to the unique receiving frequency assigned to a neighboring node in the node cluster.

In this aspect, the invention may further comprise transmitting outgoing messages from the first node to the neighboring nodes using unique receiving frequencies assigned to the neighboring nodes. The first node is also capable of transmitting the outgoing message to the neighboring node and receiving an incoming message from another neighboring node simultaneously.

In yet another aspect of the present invention, there is provided a radio communications device, comprising a receiver configured to receive an aggregated radio signal existing at the radio communications device, a spectrum analyzer, coupled to the receiver, configured to produce a series of power readings for the aggregated radio signal for each frequency in a plurality of frequencies, a waveform profile generator configured to produce a waveform profile based on the series of power readings and a power limit, and a filter, coupled to the receiver, configured to detect in the aggregate radio signal a transmission signal addressed to the radio communications device, and to discard any portion of the transmission signal carried on a frequency corresponding to an unacceptable transmission frequency. The waveform profile defines the set of unacceptable transmission frequencies. A radio communications device operating in accordance with this aspect of the invention may also include a signal data processor configured to generate a model power level (e.g, an average or median power level) for the aggregated radio signal for each frequency in the plurality frequencies based on the series of power readings. The radio communications device typically would also include a transmitter configured to transmit the waveform profile to a second radio communications device or to multiple radio communication devices in the network.

Preferably, the radio communications device in this embodiment of the invention also includes a correlator, or a plurality of correlators, coupled to the filter, configured to determine whether the detected transmission signal contains a pattern uniquely associated with one or more other radio communications devices in the network. Each pattern in a multiplicity of patterns is orthogonal to each other pattern so that the correlators may be used to identify discrete patterns being carried by a single frequency or group of frequencies. The radio communications device may further include a media access controller ("MAC controller") configured to toggle the radio communications device back and forth between a transmit mode and a receive mode.

In still another aspect of the invention, there is provided a method for managing co-site interference in a wireless network, comprising the steps of: (1) identifying a subset of nodes within a multiplicity of nodes, each node in the subset being capable of transmitting data to each other node in the subset in accordance with a defined connectivity threshold and using a power setting that falls within a low power range; (2) defining a collection of transmission frequencies to be used by nodes of the subset only when transmitting to a node outside of the subset; and (3) permitting only one node of the subset at a time to transmit using any transmission frequency within the collection. In this embodiment, access to certain frequencies for data transmissions are serially allocated to the members of the subset so that only one node may use those frequencies at a time. Since nodes in a mobile network may be moving continuously, the method may further include the step of updating the subset of nodes in short (i.e., low power) range of each other according to a schedule, at regular intervals, when it is determined that a significant amount of node movement has occurred, or upon a determination that some combination of any one or all of the foregoing situations has occurred.

In preferred embodiments, the step of identifying a subset of nodes in short range of each other is carried out using a K-Means vector quantization algorithm. The step of serially allocating permission to use the long-range links is carried out using a point coordination function.

In this embodiment, all nodes in the subset are configured to receive transmissions on the any transmission frequency in the collection while no node in the subset is transmitting on that transmission frequency. Preferably, a unique spread-spectrum code is associated with the subset of nodes, so that transmissions from the subset may be identified as such.

To better manage interference, another layer of clustering may be implemented, which involves identifying a second subset of nodes within the multiplicity of nodes, wherein each node in the second subset is capable of transmitting data to each other node in the second subset in accordance with the defined connectivity threshold using a power setting that falls within a medium power range. A second collection of transmission frequencies is generated, this collection to be used by the nodes of the second subset to transmit using a power setting that falls outside the medium power range. Here again, only one node of the second subset at a time is allowed to transmit using any transmission frequency within the second collection.

Also provided is a method for managing congestion at an elevated node in a wireless network, comprising the steps of: (1) identifying a subset of nodes within a multiplicity of nodes, each node in the subset being capable of transmitting data to each other node in the subset in accordance with a defined connectivity threshold and using a power setting that falls within a low power range; (2) defining a collection of transmission frequencies to be used by nodes of the subset only when transmitting to the elevated node; and (3) permitting only one node of the subset at a time to transmit to the elevated node using any transmission frequency within the collection. This process manages the network communications in such way as to avoid high fan-in congestion. In this embodiment, nodes of the subset are serially allocated permission to use certain frequencies to transmit to the elevated node. All nodes in the subset are configured to receive transmissions on the any transmission frequency in the collection while no node in the subset is transmitting on the transmission frequency.

A wireless network configured to operate in accordance with the present invention comprises a plurality of short-range links, a multiplicity of nodes configured to automatically identify a cluster of nodes within the multiplicity capable of transmitting data to each other node in the cluster via the plurality of short-range links using a power setting that falls within a low power range. The multiplicity of nodes is also configured to self-select a node in the cluster to act as a long-range transmission manager, which permits only one member of the cluster at a time to transmit using any power setting that falls outside the low power range.

A radio communications device in accordance with this embodiment may comprise a transmitter configured to send data to any other media access controller in the multiplicity using a power setting that falls within a low power range, and a media access controller configured to receive a plurality of requests from the multiplicity of other radio communications devices to transmit using a power setting that falls within a high-power range. Here again, the media access controller is configured to grant only one request in the plurality of requests at a time. The radio communications device may be further configured to receive any transmission having a power level that falls within the high-power range while no radio communications device in the multiplicity of other radio communications devices is transmitting using the power level. Preferably, the radio communications device also includes a correlator, or multiple correlators, configured to determine whether the transmission contains a pattern associated with a particular radio communications device in the multiplicity of radio communication devices.

Finally, a method of managing real-time data traffic in a wireless communications network is provided. The network has a multiplicity of nodes and is configured to transmit a data stream along a route from a source node in the network to a destination node in the network according to a routing protocol. This method comprises the steps of receiving at an intermediate node in the route a data packet from the data stream and a request to transmit the data packet to the next node in the route and determining whether the next node is operating in a receiving mode. If the next node is operating in the receiving mode, the data packet is transmitted to the next node. However, if the next node is not operating in the receiving mode, then the data packet is forwarded to any other node in the multiplicity of nodes that is both in the receiving mode and nearer to the destination node than the intermediate node.

Aspects of the present invention may be implemented using software radio technology, which provides flexibility to make dynamic adaptive use of spectrum under rapidly changing interference conditions. Software radios also support advanced adaptive Media Access Control (MAC) protocols. Vanu, Inc. (www.vanu.com) of Cambridge, Mass., for example, makes software radios suitable for using as a transceiver in a network configured to operate in accordance with the present invention.

Software radio technology also enables implementing embodiments of the present invention using COTS (commercial-off-the-shelf) processor-based radios that will improve over time, incorporating new signaling protocols as they become available, and incorporating ever more efficient components in terms of size, weight, and power. Software radios may be built around Intel Pentium 4 processors, for example, which currently operate at clock speeds of about 3.2 GHz, are projected to operate at clock rates beyond 10 GHz by 2005. Because the software used in a software radio is portable, networks and networking devices designed according to embodiments of the present invention can be upgraded over time to feature the latest and fastest COTS processors. In addition, the invention can easily be configured to use RF-to-digital front-end technology, which can provide all the necessary analog functions on a compact card. Rapid technology improvements in this area make these front ends quite affordable, so there is no impediment to operating each network node with multiple independent transceivers. This rapid evolution in transceiver technology is evident, for example, in today's two-chip CMOS implementations of IEEE 802.11a 54 Mb/s OFDM transceivers.

BRIEF DESCRIPTION OF THE DRAWINGS

The foregoing summary, as well as the following detailed description, will be best understood in conjunction with the attached drawings, which are incorporated in and constitute part of the specification. The drawings illustrate preferred embodiments of the invention, and, together with the description, serve to explain the principles of the present invention.

DESCRIPTION OF THE PREFERRED EMBODIMENTS

Figure 1:
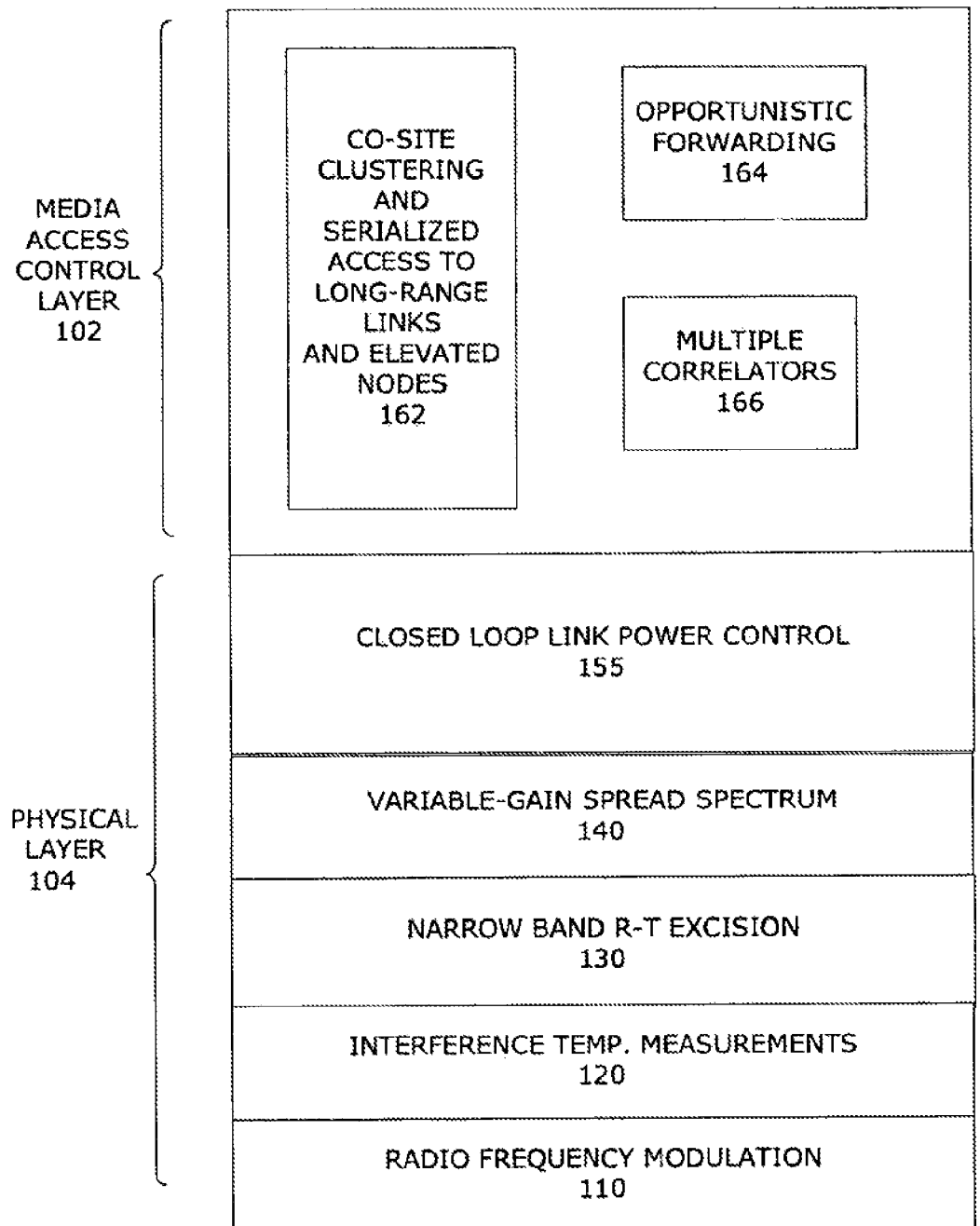
FIG. 1 depicts a high-level block diagram illustrating an arrangement of some of the physical components in a transceiver configured to operate according to an embodiment of the present invention.

Reference will now be made in detail to preferred embodiments of the invention, examples of which are illustrated in the drawings. Notably, the present invention may be implemented using software, hardware, or any combination thereof, as would be apparent to those of ordinary skill in the art. Therefore, the figures and examples below are not meant, to limit the scope of the present invention or its embodiments or equivalents.

The invention provides dramatic improvements in assured wireless communications by dynamic redistribution of allocated spectrum and advanced Media Access Control (MAC) Protocols. FIG. 1 shows an architecture that can be used to achieve these improvements according to an embodiment of the present invention. FIG. 1 shows the various functions of the architecture as they are arranged in their appropriate protocol layers. What follows is a description of each layer of the design.

General Architecture Description

The invention provides a system for using local, metropolitan, and wide-area network (LAN, MAN, and WAN) bands for high-speed (megabit-rate) networking and seamless interoperability with current systems. Taking advantage of military L-Band, UHF and VHF allocations (cross-banding within a single network), for example, as shown in Table 1 below, different links are created for these different purposes.

| Band | Use | Per-Hop Range | Path Loss | Data Rate | Analogy |
|---|---|---|---|---|---|
| Mil-3: 1710-1850 MHz | W-LANs (Squad) | 0.2 Km | 60-90 dB | ~10 Mb/s | Star Trek "Comm Badge" |
| Mil-UHF: 225-400 MHz | W-CANs (Company) | 5 Km | 90-120 dB | ~2 Mb/s | Star Trek "Communicator" |
| Mil-VHF: 30-88 MHz | W-MANs (Bde) | 30 Km | 120-150 dB | ~0.5 Mb/s | 30 times faster than SINCGARS |

This approach, namely providing a range of different link types, all integrated into a single network with automatic cross-banding in nodes with multiple independent transceivers, provides all the benefits needed for successful megabit-rate wireless networking.

Path loss (PL) is the ratio of the signal power coming down the receive feedline from an isotropic receive antenna, to the signal power going up the transmit feedline to an isotropic transmit antenna. In the example of 90 dB path loss, every Watt transmitted turns into a nanoWatt received. Assuming the use of isotropic antennas (gain=1=0 dB), the path loss (PL) that can be tolerated on a link (link budget) is the ratio of the available transmit power, to the receiver sensitivity (required receiver power). The Mil-VHF band provides much better propagation (longer range) for modest power, as the effective area of an omni-directional antenna may be represented by the equation $\lambda^2/4\pi$, where $\lambda$ is the wavelength. This results in almost a 30 dB improvement in path loss (P.L.), for 30 times the line of sight (LOS) range compared to the Mil-3 band. Diffraction around wavelength-sized obstacles (e.g., 10 meter hills or buildings) can make an even greater difference beyond LOS.

In contrast, the Mil-3 band provides much higher available bandwidth, permitting far higher data rates over short ranges. In fact, the short range here results in both high spatial reuse of the frequency allocation, and a low power, LPI/LPD signal with wide spectrum spreading. Having an unobtrusive signal eliminates the need to contest spectrum "ownership".

The Mil-UHF band is intermediate between these two in both range and available bandwidth, satisfying the need for medium range links.

As shown in FIG. 1, an architecture structured according to an embodiment of the present invention compromises both physical layer 104 and media access control (MAC) layer 102 components. At the physical layer 104 the functional components of the architecture may include components for radio frequency modulation 110, interference temperature measurements 120, narrow-band receive-transmit R-T excision 130, variable-gain spread spectrum 140 and closed loop link power control 155. The MAC layer 102 comprises components for implementing co-site clustering and serialized access to long-range links and elevated nodes 162, opportunistic forwarding 164 and multiple correlators 166 for detecting specific waveform patterns. Each of these components are described in more detail below.

Co-Site Clustering and Multiple Correlators

A significant problem encountered when using the spectrum for wireless communication is co-site interference, which occurs when transmissions to distant nodes overwhelm reception by local nodes. The present invention addresses the co-site interference problem by using multiple independent transceivers of different frequencies (bands) to establish short links (e.g., 60-90 dB PL), medium links (e.g., 90-120 dB PL), and long links (e.g., 120-150 dB PL), as shown in Table 1 above.

Co-site clustering and serialized access component 162 comprises MAC protocols that automatically define W-LAN groups (good internal connectivity with short-range links), in which use of any medium-range link is serialized. W-MAN groups (nodes with good internal connectivity using medium-range links) are defined, in which use of any long-range link is serialized.

A K-Means vector quantization algorithm may be used to define co-site clusters and dynamically update them. Within each cluster (e.g., squad W-LAN), a point coordination function (PCF) is used to serialize access to a medium-range link. Each cluster alternates between receiving over multiple medium-range links, and transmitting over one medium-range link. Using multiple correlators 166 and a different spread spectrum code for each W-LAN permits simultaneous use of medium-range links by different squads without interference.

In a preferred embodiment, a number of nodes have elevated antennas to provide long-range links for "Small World" latency reduction and low-latency quality of service (QoS) traffic. As described below, a specialized MAC protocol to handle the very high fan-in usually associated with using elevated nodes may be used to avoid congestion at the elevated node.

For extremely low delay traffic, packets are forwarded to any node in the direction of the destination (lower hop count) that is not currently transmitting (like a soccer player passing to an open teammate downfield). Although this violates the customary practice of strict protocol layering, by using instantaneous information from the MAC layer to guide network forwarding decisions, it eliminates the dominant end-to-end latency effect of channel access delay at each hop. Opportunistic forwarding component 164 carries out this function. The opportunistic forwarding component 164 carries out forwarding of packets based on their indicated (differential services, or diffserv) quality of service. Bulk traffic is forwarded via low-power multi-hop routing, to maximize spatial reuse of frequencies and enhance LPI/LPD. Real-time voice traffic traverses the network in fewer hops at higher power in order to minimize end-to-end latency.

Closed Loop Link Power Control

Closed loop link power control component 155 provides feedback from each receiver to a neighboring transmitter to minimize transmit power for a reliable link. This maximizes spatial reuse of frequencies, minimizes network self-interference, improves LPI/LPD, and minimizes battery drain for portable nodes.

This may be accomplished by keeping transmit power density low (e.g., <50 mW/MHz or 1 W per 20 MHz) in any frequency or time interval, subject to topology control to maintain a connected network. This also enhances spectrum compatibility with other friendly narrowband and wideband (NB and WB) systems. This limit on power density also helps achieve LPI by thwarting linear (spectrum analyzer) interceptors. Wideband waveforms may be used to achieve the desired ranges.

Variable-Gain Spread Spectrum

Variable gain spread spectrum component 140 controls the processing gain (spectrum spreading factor) associated with a node in the network. In preferred embodiments, different levels of security may be implemented by varying the processing gain (PG). In the military battle context, for example, very high PG (e.g., 30 dB) may be used during covert insertion and special operations; medium PG (e.g., 20 dB, higher data rate) may be used for entry and positioning of major forces; and modest PG (e.g., 10 dB, highest data rates) be used during actual battles. Flexible software radio technology enables the use of variable PG.

Multiple receive correlators 166 in the MAC layer 102 may be used to receive simultaneously from multiple neighbors. Spread spectrum signaling increases bandwidth by a factor of the PG. Using multiple correlators recoups spectrum efficiency by a factor of the number of neighbors, up to the square root of the PG.

Narrowband R & T Excision

Narrow band R-T Excision component 130 controls the process for using zero power at certain frequencies during transmission and ignoring information (power) existing at those frequencies on the receiving end. In preferred embodiments, orthogonal frequency division multiplexing (OFDM) waveforms with 25 KHz channels that support transmit and receive narrow band excision may be used to eliminate interference with legacy systems. The OFDM signal (which is the sum of many complex exponentials, each with an independent phase) approximates a Gaussian envelope featureless waveform for LPI/LPD. R&T excision may be adjusted on a very dynamic basis (milliseconds) to underlay spectrum allocated for a legacy channelized narrow band system.

In preferred embodiments, short-term power spectrum measurements (<<1 sec) may be taken at the receiver, and narrow band (25 KHz) excision of spectral spikes are used to minimize interference produced by legacy systems. Matching narrow band excision of the same spikes at neighboring transmitters eliminates interference experienced by narrow band legacy systems.

Interference Temperature Measurements

Interference temperature measurements component 120 monitors aggregate signals present at the receiver in the wireless network. In preferred embodiments, each receiver does its own spectral analysis of local interference, assigns its own receive frequencies automatically, and reports them to its neighbors over a common, low data rate, configuration channel. Selecting low-interference frequency ranges minimizes transmit power requirements and avoids congested spectrum.

Radio Frequency (RF)-to-Baseband, Using Multiple Transceivers

As described in more detail below, a wireless networking architecture according to the present invention may also include radio frequency modulation component 110 in order to increase throughput capacity and provide more secure transmissions. For example, and as described in more detail below, multiple transceivers may be used at each node to support simultaneous operation in multiple bands, simultaneous spectral analysis and communications, and other functions. Wide-sense stationary waveforms may also be used to thwart $2^{nd}$ order cyclo-stationary interceptors. Zero mean, equal power, uncorrelated I and Q signals conceal the carrier frequency. Nyquist filtered symbols may also be used conceal the symbol clock.

In multi-antenna nodes, a separate time division duplex (TDD) transceiver may be assigned to each directional antenna. This provides far more throughput than a single-transceiver architecture that switches one transceiver among multiple antennas.

And finally, a distinct receive frequency may be assigned to each node for multiple, non-interfering transmissions in a network having a multiplicity of nodes.

A more detailed discussion of the characteristics of each node in a wireless network configured to operate according to a preferred embodiment of the present invention will now be provided. Each node in the preferred embodiment is configured to perform the following three receiver-centric activities.

1. Each node continuously carries out real-time sensing and characterization of the local spectrum at the receiver of each node due to (potentially interfering) narrowband and wideband emitters. For example, this analysis could use a 2K complex FFT every 100 usec to achieve 10 KHz resolution over a 20 MHz bandwidth of interest. These measurements will be different at each network node, since each node has a different interference environment. Any other information about the types of transmissions occurring in band with potential for sharing should be gathered at this time. The underlying principle here is that different "applications" can tolerate differing degrees of interference (i.e. A TV broadcast may not tolerate much interference but a wireless packet switched network may tolerate a small percentage of packet loss).

2. Based on the characterization performed as described above, each node further determines a waveform with optimal Power Spectral Density (PSD) to be used by neighboring nodes to transmit to this node. This process consists of "inverting" the various spectral spaces of opportunity into a realizable waveform that will approach the optimal performance predicted by pure water filling (to be described in detail below).

3. Each node reports its optimal receive waveform (an economical parametric characterization of the optimal PSD) to each of its (e.g., handful of) network neighbors for the neighbor's use in talking to this node, preferably along with an optimal transmit schedule and an expiration time after which the information should be considered stale. The waveform reporting function may be performed in conjunction with executing other functions provided by an optional XG transceiver application programming interface (API). Such APIs typically include extensions of the Future Combat Systems Communications primitives. These primitives currently support the receiving node's power control feedback loop with each of its neighbors. The feedback loop ensures that the XG signal arrives at this node's receiver with the same power from every neighbor, minimizing problems of near-far receiver masking).

This architecture is called receiver-centric, because it focuses largely on eliminating interference, which only occurs in the nonlinear circuits of a receiver, not at a transmitter. Each receiver is responsible for minimizing its own interference by designing a minimal-interference waveform, and directing all its neighbors to use this waveform to transmit to it. Different receivers will design different waveforms, depending on their local interference.

In preferred embodiments, the present invention may be characterized as having two different temporal metabolisms. At a low level, the local noise interference may be estimated on a msec-by-msec time scale, making very short term predictions that the next msec will resemble the previous one. On a longer time scale of tens or hundreds of msec, time-varying models of the interference may be developed based on recognition of the type of application (e.g., video stream) causing the interference. On this time scale, a temporal model may be used to predict which short term waveform should be used at which time.

Methods for Time-Frequency Water Filling

A description of the methods used to derive an optimal power spectrum density for static (short term) waveform generation based on short term (e.g., 1 msec) spectral measurements will now be provided. This method permits each transceiver to determine, based on measurements in its receiver, the power spectrum density its neighboring transceivers should use to transmit to it to maximize its detected signal to noise ratio (SNR) under the constraint of limited transmit power. In the embodiment described below, we assume that the interference spectrum over the next msec (or multiple msec) will be the same as it was in a previous measurement. It should be apparent to those skilled in the art, however, that when the measured spectrum changes significantly, the node must notify its neighbors of the updated optimal waveform.

Optimal Stationary (Short Term) Waveform Selection

The water-filling approach has long been known as the optimal way to minimize the mean squared error of a channel with colored background noise. This optimality is based on minimizing the mean squared error between the signal at the detector and the originated signal (maximizing the received SNR), subject to the constraint that the transmitted signal has a limited total power S.

Figure 2:
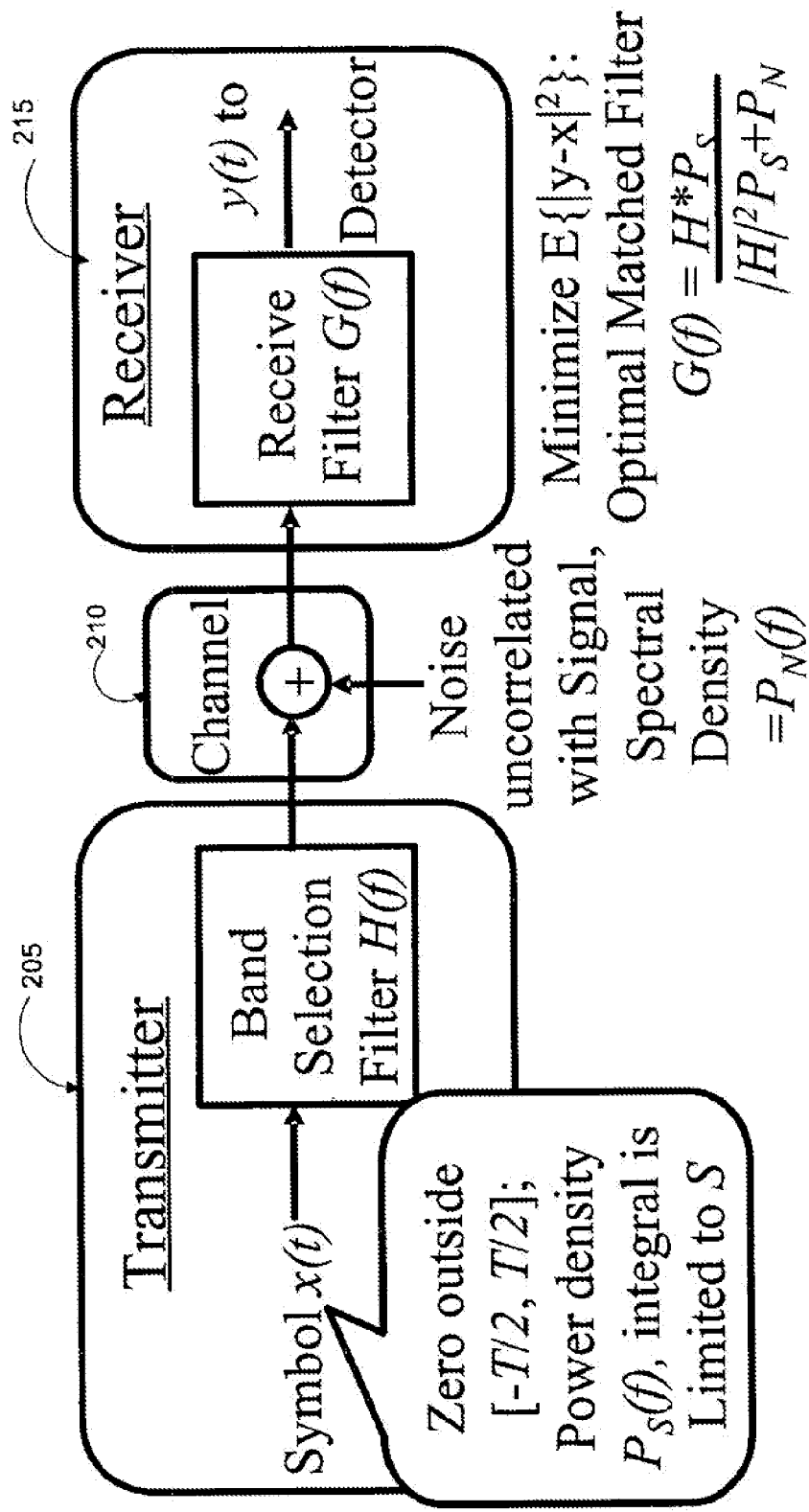
FIG. 2 shows a reference model defining the characteristics of a channel between a transmitter and a receiver configured to operate in accordance with principles of the present invention.

FIG. 2 shows a reference model defining the characteristic's of a channel 210 between a transmitter 205 and a receiver 215. In FIG. 2, $P_s(f)$ is the signal power spectrum density (Watts/Hz) at the source. H(f) represents the value of a band selection filter, which is equal to 1 inside the system's desired band of operations, and 0 outside the desired band of operations. Thus, band selection filter H(f) rejects undesired out-of-band signals. G(f) represents the value of the optimal matched filter. When optimal match filter G(f) is applied to the input signal spectrum (which includes noise) at the detector, the filtered signal has the maximum signal to noise ratio. T is the time interval (sec) for signaling one symbol. A T of 1 usec means a signaling rate of 1 Msamples/sec. $P_n(f)$ is the noise power spectrum density (Watts/Hz) arriving at the receiver along with the desired signal. The optimal PSD results from the "water filling" approach, where the sum of the interference level (weighted by the band selection filter) and the additional received signal power from neighbors is not more than a constant (the water level).

In a static world, the following optimal water filling would occur:

At frequencies where local interference exceeds the water level, no power should be transmitted. This automatic transmit excision minimizes the interference from XG signaling to legacy users.

At these same frequencies, the optimal matched filter in the receiver has zero gain. This automatic receive excision minimizes the interference from legacy users to XG users.

As a result, the XG network is an underlay network service that meets the requirements for secondary use of the band, namely, accepting any interference from existing users and agreeing to cause no harmful interference.

In actuality, there are many reasons why this cannot happen in a real system. For example, there is always power leakage in the spectra because signals have finite bandwidth. The question is, how much is allowable, and whether the signal contained in that leakage is missed when it is reconstructed erroneously.

Figure 3:
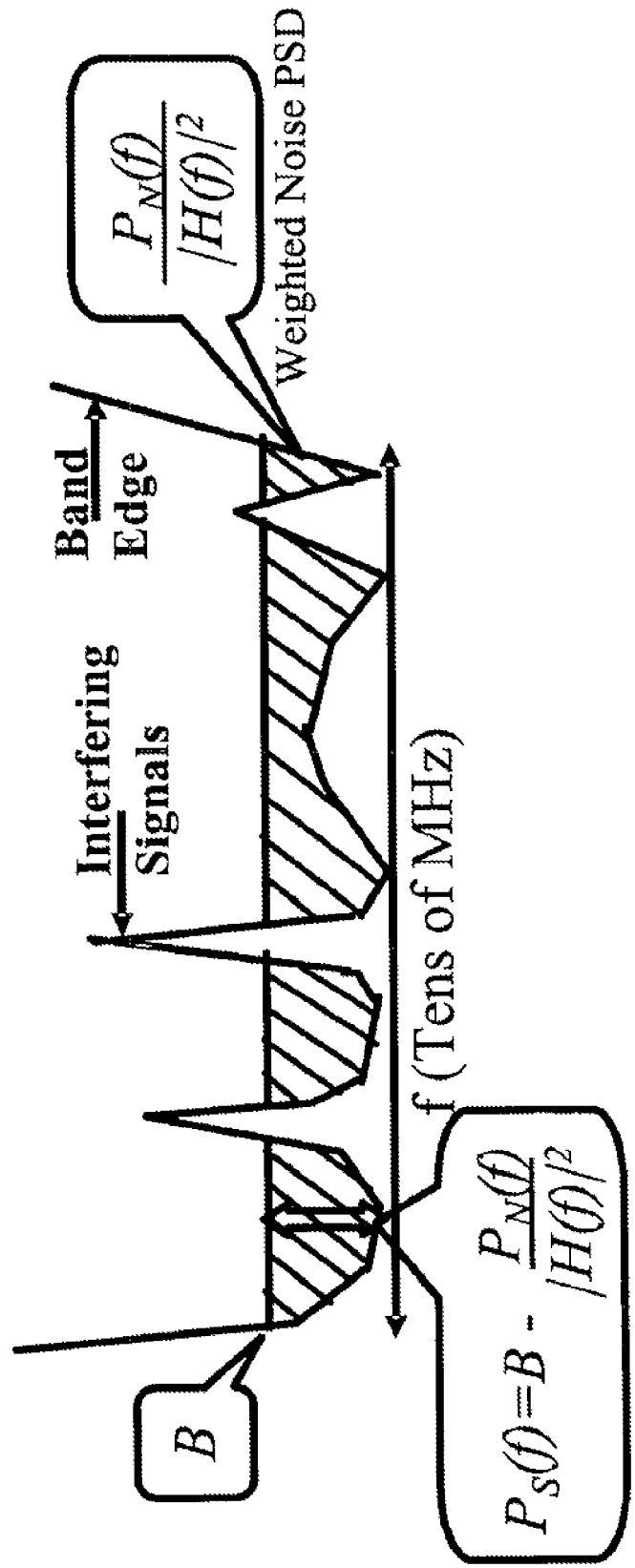
FIG. 3 graphically illustrates a method of calculating the power spectral density (PSD) of an optimal waveform according to embodiments of the invention.

FIG. 3 graphically illustrates a method of calculating the power spectral density (PSD) of an optimal waveform according to embodiments of the invention. As can be seen in FIG. 3, the PSD (represented by the variable $P_s(f)$ in FIG. 3) is equal to the interference limit B minus the measured noise floor $P_N(f)$ within the band of interest. The optimality of the waveform is based on minimizing the mean squared error between the signal at the detector and the originated signal, subject to the constraint that the transmitted signal has a limited total power S. Receive excision suffers from finite front-end dynamic range, limiting how large the peaks in FIG. 3 can be before they swamp the front end of the receiver. In this case, the spectrum cannot be inverted in one fell swoop, and may need to be passed through selective analog filtering before digitization.

Characterizing Background Interference

Techniques for defining the stationary waveform best tailored to the short-term noise/interference spectrum received at a node will now be described. These techniques may be used, in embodiments of the invention, to maximize the received SNR subject to limited transmit power. Noise in a specified bandwidth, W, appears as a bivariant Gaussian signal in the in-phase (I) and Quadrature-phase (Q) channels, both measured in RMS Volts across the impedance of the measuring device, typically R=50 ohms. The total power measured in this bandwidth is then $P=(I^2+Q^2)/R$, with a Gaussian probability density function (PDF) for both I and Q. A change of independent variable to measured power P shows that it has an exponential PDF equal to $1/P_0 \exp(-P/P_0)$, with mean=standard deviation=$P_0$ and median $P_0 \ln 2 \sim 0.693\ P_0$.

Noise appears when coupling the measuring device to a resistive load or an antenna operating in a thermal environment with absolute temperature T Kelvins. The noise power resulting from thermal excitation is k T W, where k is Boltzmann's constant $1.38*10^{-23}$ Watts/Hertz/Kelvin. This results from Einstein's equipartition of energy theorem, where each mode of a system in thermal equilibrium receives an excitation of kT/2 joules. However, any measuring device has implementation defects characterized by a noise figure F, which is the ratio of its actual measured noise power referred to the input of the device, to the ideal value of k T W for the thermal noise above. Here the reference value of T is conventionally taken as 290 K (room temperature), and F is normally a few dB for low noise amplifiers. The net equivalent input noise is thus k T F W.

Attaching antennas to a node also brings in signals from intentional radiators. When there are large numbers of uncorrelated faint signals (e.g., from many distant radiators) in the bandwidth being measured, the Central Limit Theorem (CLT) says that the resulting summed signal again approaches a bivariant Gaussian. Therefore, this particular background interference can also be characterized as thermal noise in a still hotter environment, namely a higher value of T. The FCC Spectrum Policy Task Force defines this equivalent as the interference temperature $T_i$.

Today's Spectrum: Narrowband (NB) Interferers

In addition to the noise signals described above, an antenna on a node will pick up strong signals from other (friendly and hostile) users. Many of these signals are narrowband (e.g., 25 KHz channels allocated for voice and low rate data in the UHF band), and may be non-Gaussian, since data signals often have constant envelopes for efficient power amplification. They can appear and disappear on time scales corresponding to users activating push-to-talk switches (i.e., a time scale of seconds). In the case of frequency hopping radios, the dwell time in a particular 25 KHz channel may only be on the order of milliseconds, while a cellular phone call can last minutes. In any case, these narrow band signals appear on a spectrum analyzer as narrow "fingers" sticking up above the noise floor in the band of interest (which is normally MHz to tens of MHz wide).

The spectrum analyzer measures the power in each of a large number of adjacent frequency bins over a short time. The shortest time interval for independent measurements corresponds to calculation of a discrete Fourier transform (DFT), where the measurement interval is the reciprocal of the frequency bin resolution (e.g., 100 μsec measurements for 10 KHz resolution). The measurements described and plotted below were made using a Rhode & Schwartz lab quality spectrum analyzer, exporting digital data to EXCEL and MATLAB for analysis and plotting.

Probability Distribution and Statistical Analysis for "Noise Floor" Estimation

Experiments were conducted to carry out statistical characterization of the "noise floor" in a band of interest. The initial calibration experiments used a room temperature resistor (290 K) feeding a lab-quality Rhode & Schwartz Model FSEM spectrum analyzer examining a 5 MHz span centered on 450 MHz with 10 KHz resolution. (The spectrum analyzer was preceded by a 24 dB (5 dB N.F.) wide band preamp). The noise power measured in adjacent bins was uncorrelated.

Figure 4:
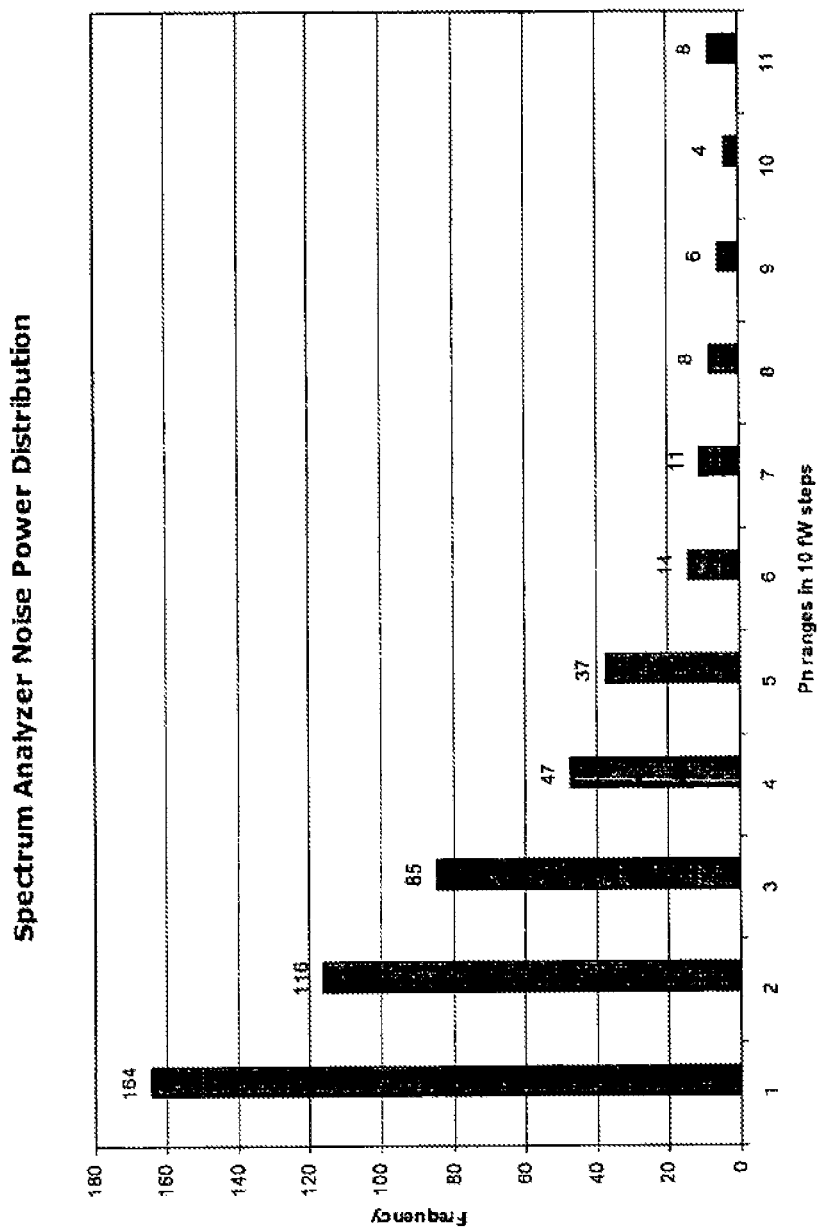
FIGS. 4 through 11 contain plots and graphs illustrating the results of spectrum measuring experiments supporting the need for and the benefits of the present invention.

FIG. 4 shows typical sample data plotted as a histogram (relative frequency of noise power occurrence~PDF, versus power) resulting from 500 independent power samples.

Figure 5:
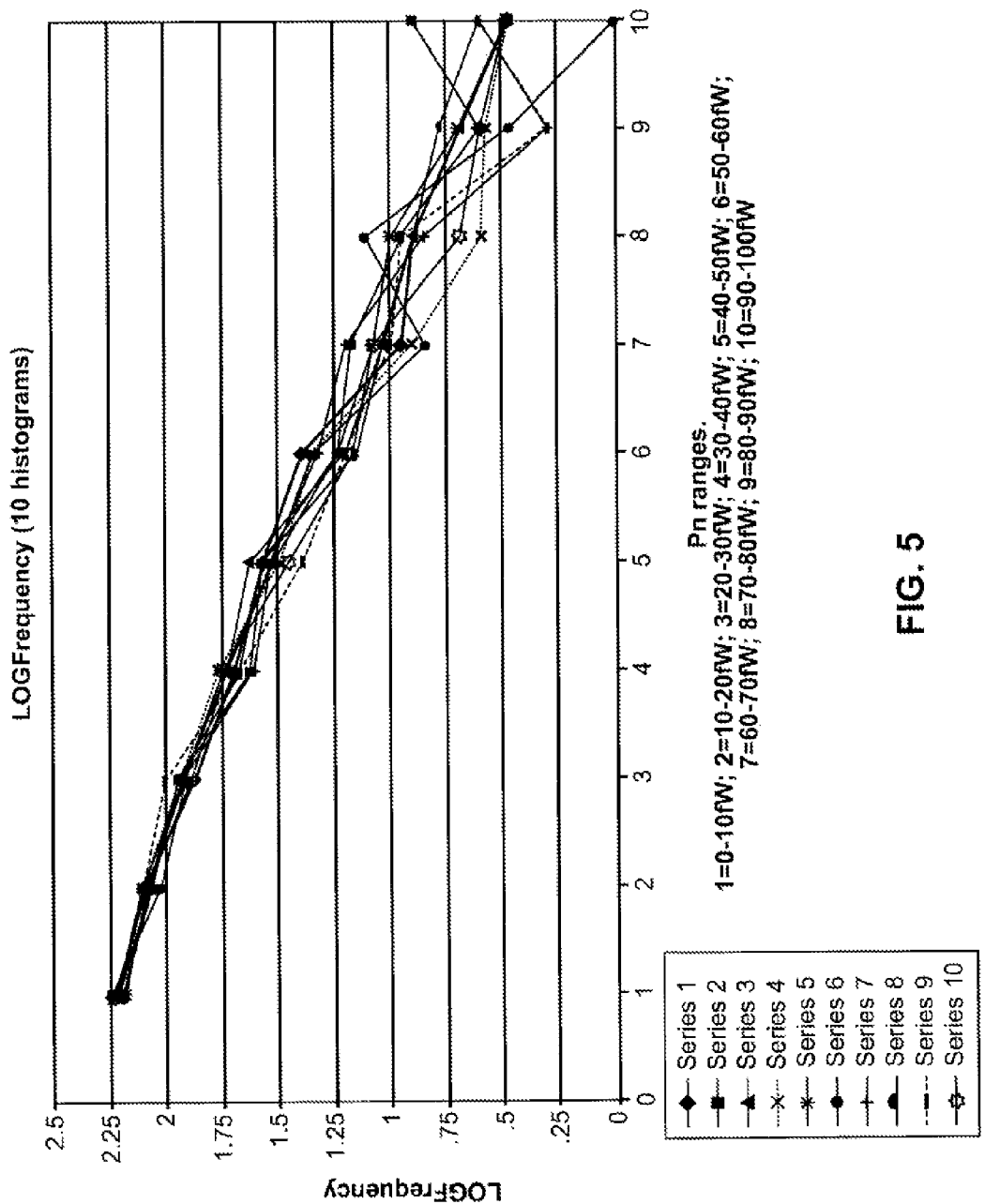

FIG. 5 shows the results of ten identical but independent measurement runs with histogram plotted on a log scale, as a function of the power measured. The straight line of log probability versus measured power demonstrates the predicted exponential probability density function $1/P_0 \exp(-P/P_0)$, with $P_0$=0.198 fW (−127 dBm). This measured power is 7 dB above k T W (−134 dBm), so the experimental setup has a 7 dB noise figure. The plot shows that the statistical fluctuation in the measurements is far greater at higher power levels, where the small number of samples results in relatively greater sampling fluctuations.

In order to estimate the "noise floor", i.e., the interference temperature, N power samples were averaged for each frequency bin in order to get a stable, unbiased estimate of average power. The PDF for this sample mean is the N-fold convolution of the exponential PDF scaled by a factor of N, namely:

$$\text{Prob}(P) = \frac{N^N}{(N-1)!} \frac{P^{N-1}}{P_O^N} \exp(-NP/P_o) \quad \text{(Equation 1)}$$

with mean $P_0$ (as expected) and mode (most probable power) of $P_0(N-1)/N$. For N=10, the median is 0.95 $P_0$. The standard deviation is $P_0/\text{sqrt}(N)$. The sqrt(N) factor in this denominator can substantially reduce the variations (statistical fluctuations) in our estimate of the mean power in the noise floor. If the spectrum analyzer does a DFT every 100 μsec (10 KHz resolution), averaging ten samples per bin would take 1 msec to develop this estimate of mean power in all bins.

Figure 6:
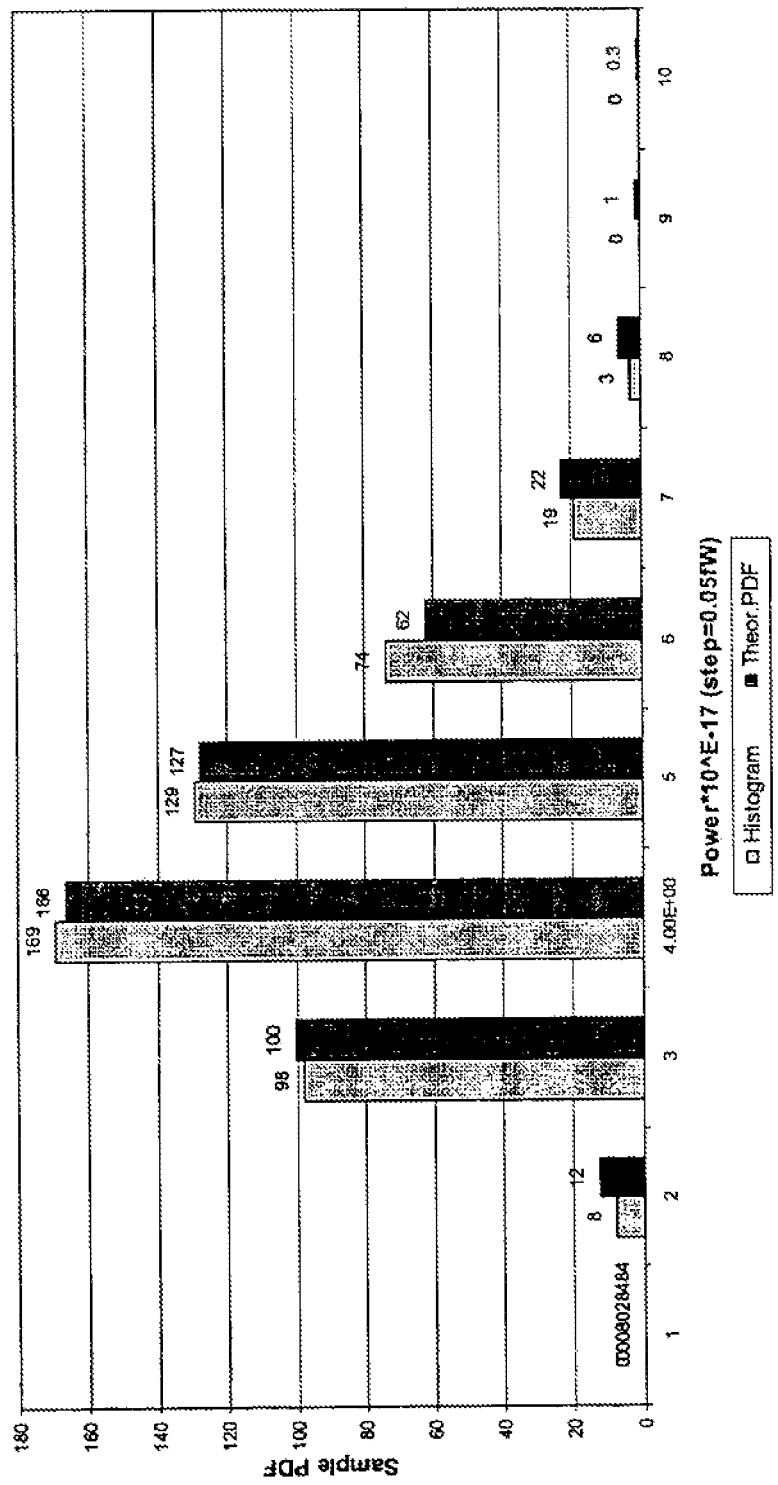

FIG. 6 shows a comparison of a histogram derived by averaging the results of the 10 experiments of FIG. 5 (relative frequency of occurrence of a given mean power in a bin), compared with the theoretical PDF of Equation 1 above. The agreement between the two histograms is excellent, showing that a 10-sample power estimate in each bin provides a good characterization of the noise floor $P_O$.

As described above, some frequency bins will reflect strong narrowband signals by measuring relatively large power. The goal is to determine which bins contain only noise power corresponding to the measured noise floor (interference temperature), and which contain strong signals. The XG signal PSD will then fill up each noise-only bin to a "water filling" temperature below the FCC-specified maximum interference temperature, and transmit zero in bins where strong signals already exceed the water level. However, since all measures are probabilistic, any decision must be characterized by its confidence level, as described below.

The null hypothesis is that there is only noise in bin M. If the power measurement for this bin is statistically significant (e.g., 0.01), then the null hypothesis for this bin is rejected, and the conclusion is that there is a strong signal present. Such a large mean power measurement would happen only in one run out of 100 if only random noise is present. This permits rejection of the null hypothesis with a fair degree of confidence. The significance level is the area under the tail of the PDF of the sample mean. Bins with a sample mean that exceeds the corresponding significance threshold are judged likely (e.g., with the corresponding 99% confidence) to contain a strong signal, and a system according to the present invention transmits no power in those bins. This provides transmit excision at the transmitter to minimize interference to narrow band users, and receive excision in the receiver's matched filter to minimize narrow band interference to wide band users. The remaining bins are judged likely to contain only noise, and the system transmits power in those bins up to water filling temperature, below the FCC-specified maximum permissible interference temperature.

Since the sample mean is the sum of N independent identically distributed variables, its distribution approaches Gaussian (CLT). The 99% probability distribution threshold is $P_0(1+2.33/\sqrt{N})$.

Figure 7:
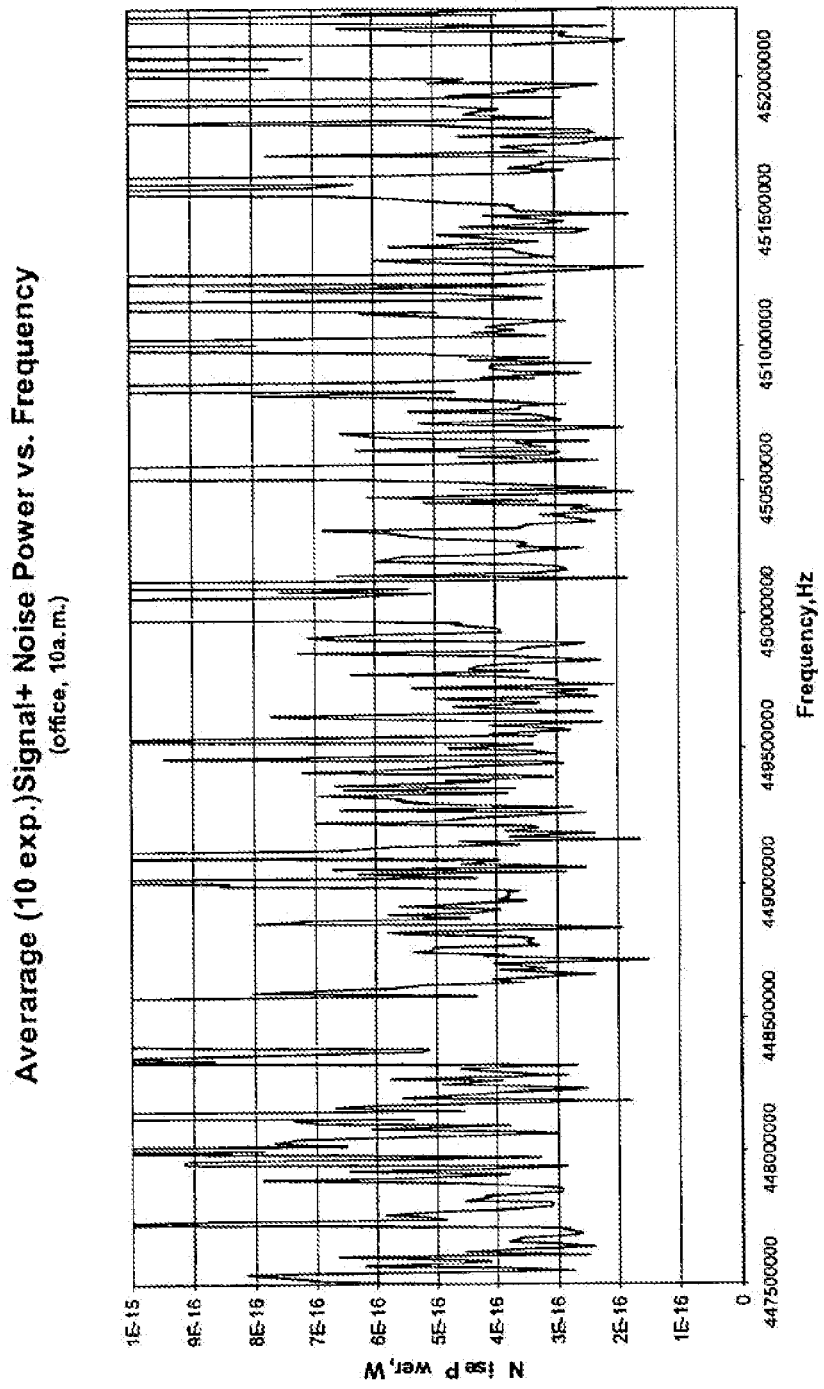

FIG. 7 shows a spectrum analysis of received signals when strong narrow band signals are present. The plot in FIG. 7 was made in linear power rather than dB in order to focus on the structure of the noise floor, and to provide an absolute reference of zero Watts. The strong signals reach far off the top of the plot (one signal is 50 dB above the noise floor). It is the noise floor, however, that we want to investigate.

Figure 8:
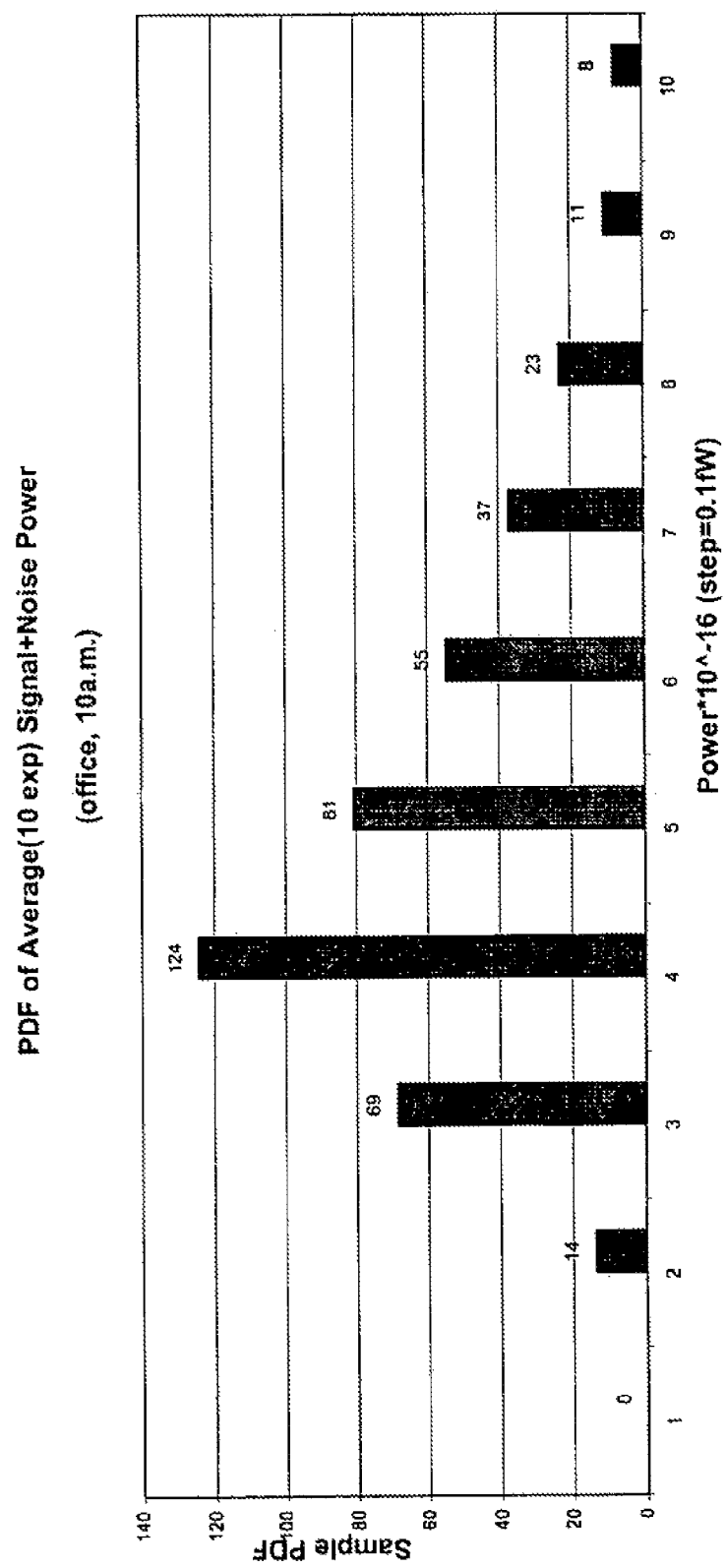

FIG. 8 shows a histogram of received power corresponding to FIG. 7. The histogram (422 samples) shows the typical power distribution "bump" due to the noise floor. Histogram samples far to the right in FIG. 8 correspond to strong signals. If FIG. 8 contained all of the samples for the received power in FIG. 7, one could observe another 78 samples (not shown in FIG. 8) located many chart widths far off to the right of the chart shown in FIG. 8 representing the strong signals. However, these strong signals are not of particular interest because it is the noise floor that is being measured. Matching the low-power histogram bump with a theoretical curve corresponding to average noise power $P_0$ permits us to estimate the underlying noise floor $P_0$, in spite of the presence of strong signals. This will also determine the threshold at 99% confidence (at $P_0(1+2.33/\sqrt{N})$) to separate the bins containing the narrow band signals from those containing only noise. The waveform synthesized as a result of this measurement will have support over disjoint frequencies, namely those judged to contain only noise.

Table 2 below shows measured results in characterizing a 5 MHz wide noise floor centered at 450 MHz at different times of the day (10 AM, 3 PM and 6 PM). The table shows average power per 10 KHz bin.

TABLE 2

| | Noise floor measured as a function of time of day. | | | | |
| --- | --- | --- | --- | --- | --- |
| Source | 290 K Resistor | Inside lab antenna | Window antenna @ 10 AM | Window antenna @ 3 PM | Window antenna @ 6 PM |
| $P_O$ = Avg.Pwr. | $2.0 * 10^{-16}$ W | $3.5 * 10^{-16}$ W | $3.5 * 10^{-16}$ W | $6 * 10^{-16}$ W | $7 * 10^{-16}$ W |

Figure 9:
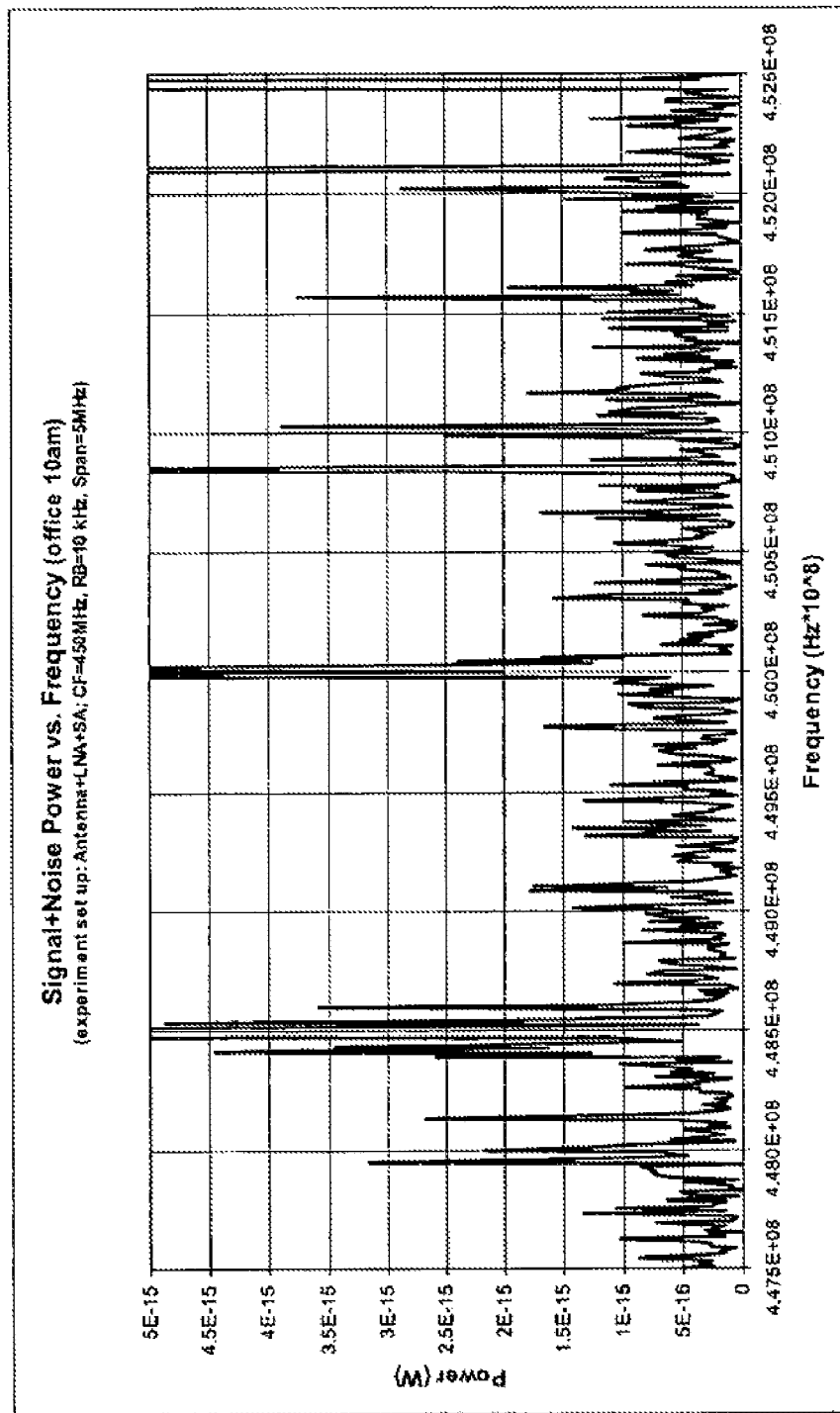
Figure 10:
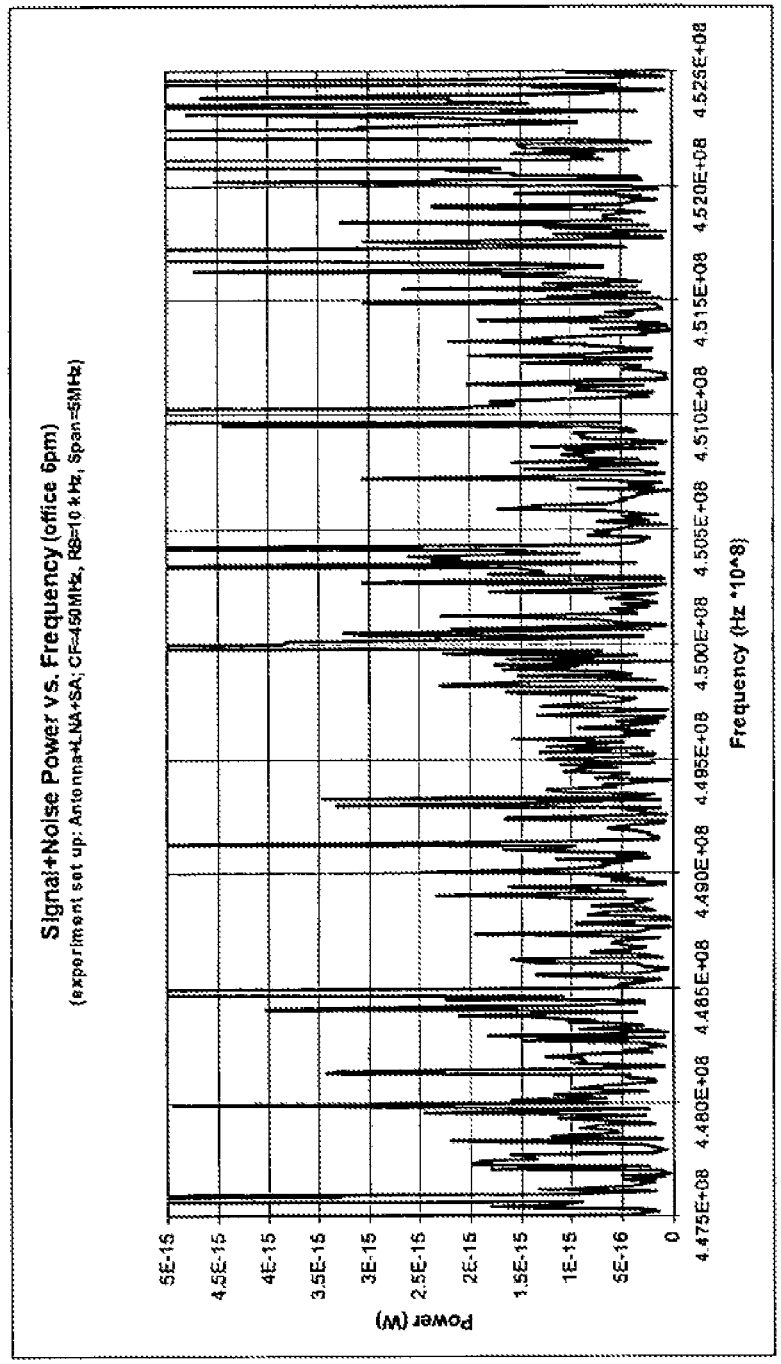

FIGS. 9 and 10 show the spectrum at 10 AM and 6 PM respectively. The later spectrum obviously has many more high power narrowband signals, and the effects of some of their "skirts" (unintended radiation at nearby frequencies) can be seen in the elevated noise floor. At other frequencies, the noise floor is elevated for unknown reasons, perhaps because of large numbers of additional faint signals.

Analysis of a single "noise only" bin in the time domain showed no discernible features. Each scan has nonrepeating wiggles (like Gaussian noise), and successive values (at 100 used sampling interval for the 10 KHz analysis bandwidth) are uncorrelated.

The results of these tests provide a strong indication that the elevated (and varying) noise floor is the sum of a large number of weak narrowband signals (or a smaller number of wideband signals) from unknown sources outside the building, and some skirts from strong signals.

The results were at 450 MHz, where the noise floor was flat over the 5 MHz analysis range. Examination of an equal bandwidth at center frequencies of 300 MHz and 39 MHz again showed a flat noise floor, although the noise floor was further elevated by a few dB.

The experiments described above with reference to FIGS. 4-10 illustrate only one approach for characterizing the "noise floor" for water-filling spectrum uses, based on statistical analysis of power measurements as a function of frequency and time, and based on hypothesis testing. After reading the above discussion it should be apparent to those skilled in the art that numerous other approaches may be used without departing from the scope of the present invention. Such experiments form the basis for algorithms, such as the one described below with reference to FIG. 15, which may be used in transceivers configured to operate in accordance with embodiments of the present invention.

Alternative Analysis Tool: Median Filters

Instead of using the sample mean as a power estimate for each bin, a sample median (nonlinear filter) may be used instead. A median filter outputs the 50% percentile value (the median) from a vector of N samples. These filters are often used in image processing to eliminate "outlier" samples due to impulsive noise, while preserving sharp edges.

Figure 11:
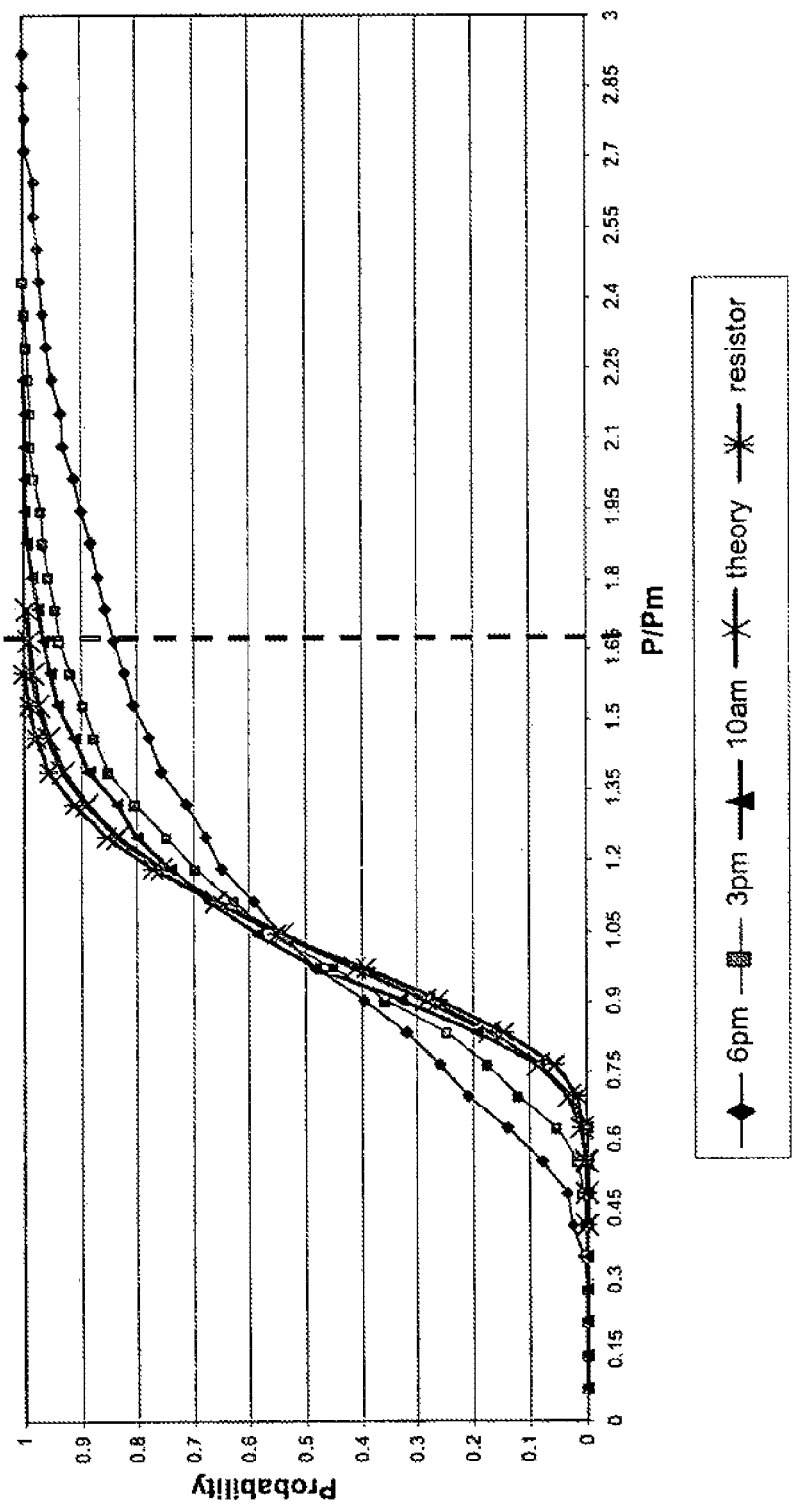

FIG. 11 demonstrates the use of the median power across a band at a particular time as a normalizing factor for the power measured in each bin. Here, for each sample spectrum, a trial median was generated across the entire band. A number of the bins reflected very strong signals (far above the band median), so bins with power more than 2.5 times the median were discarded when calculating the final band median. For the 10 AM, 3 PM, and 6 PM data, discarding these bins eliminated 71, 82, and 97 of the 500 frequency bins, respectively. After rejecting consideration of these very strong signals, the band median power in remaining bands was recalculated to characterize the noise floor by normalizing bin power with the band median power.

The theory curve gives the theoretical probability density function obtained from integrating Equation 1. The quite similar resistor curve shows the results of measured noise from a resistor source. The other three curves (10 AM, 3 PM, and 6 PM) show increasing deviations from the theoretical curve and the resistor (noise only) curve. The vertical dotted line shows the $99^{th}$ percentile value (P=1.6*Pmedian) for the theoretical curve. If this value is applied as the threshold to determine whether only noise is present in a bin or a signal is present, we will reject 1% of the bins in the noise-only case. Therefore, 99% of the noise only bins in the band will be targeted for reuse.

Using the same threshold algorithm at 10 AM, we would reject about 4% of the surviving 429 bins as containing signal. At 3 PM, we would eliminate use of 6% of the surviving 418 bins, and at 6 PM we would eliminate 15% of the surviving 413 bins for spectrum use. The overall result is that respectively 82%, 79%, and 70% of the band is still available for reuse at these times.

By using the above-described method, each receiver in a network operating in accordance with the present invention may characterize the noise floor of a band in terms of a median power across it, and normalize all bin powers in terms of this measured band median. Establishing a threshold (e.g., the 99th percentile for theoretical or measured "pure" noise) for signal presence determines the spectrum waveform for all neighbors to use to transmit to this node.

Representing the Waveform PSD (Quantified Bits)

The procedure above will mark a subset of the (hundreds to a few thousand) frequency bins as available for water-filled transmissions. Since each strong signal typically covers a number of contiguous bins, run length coding is a compact and efficient representation of this subset. If we have, for example, 12 strong signals appearing in a 4096-bin spectrum analysis, this representation might appear as 12 pairs of 12-bit integers (18 bytes total). The first number of each pair is the number of contiguous available frequency bins, and the second is the number of following contiguous unavailable bins. This representation of the desired PSD is sufficiently compact that it can easily be added to the power control feedback loop to each neighbor node in the network, specifying both the neighbor's desired transmit power and its desired PSD.

Tomorrow's Spectrum: Interference Temperature with Added WB Interferers

Once the FCC begins to succeed in its quest for more flexible and dynamic spectrum use, more wideband adaptive (XG-like) emitters will appear. They will use wideband signals to provide good spectrum compatibility among independent users, and high data rates in spite of limited transmit PSD. The resulting interference temperature will be the result of a number of uncorrelated low power wideband signals, again summing in the limit to a bivariant Gaussian signal. In this case, it isn't possible to identify individual emitters, just their composite power effect. The same statistical estimation techniques described above may be used to estimate the interference power in each bin, and send enough power in each bin to "fill it up" to the water-filling temperature below the FCC's maximum permissible interference temperature.

When the FCC's spectrum management revolution is complete and everyone is using XG technology, we can expect to see white Gaussian "noise" at all frequencies everywhere, equal to the FCC's permissible interference temperature in each band.

Representing the XG Waveform PSD (Quantified Bits)

A compact representation of the XG PSD for this case would again be a sequence of pairs of integers. The first number specifies the permissible power to be transmitted, and the second the number of contiguous bins to which the value applies. For six different measured noise floors in a band, 18 bytes can represent the desired XG PSD in the power-and-spectrum-control feedback loop messages to neighbors. When strong narrowband signals are also present, the permissible power will be zero for that interval of bins.

Trade Studies for Design of the Short-Term Waveform

Figure 12:
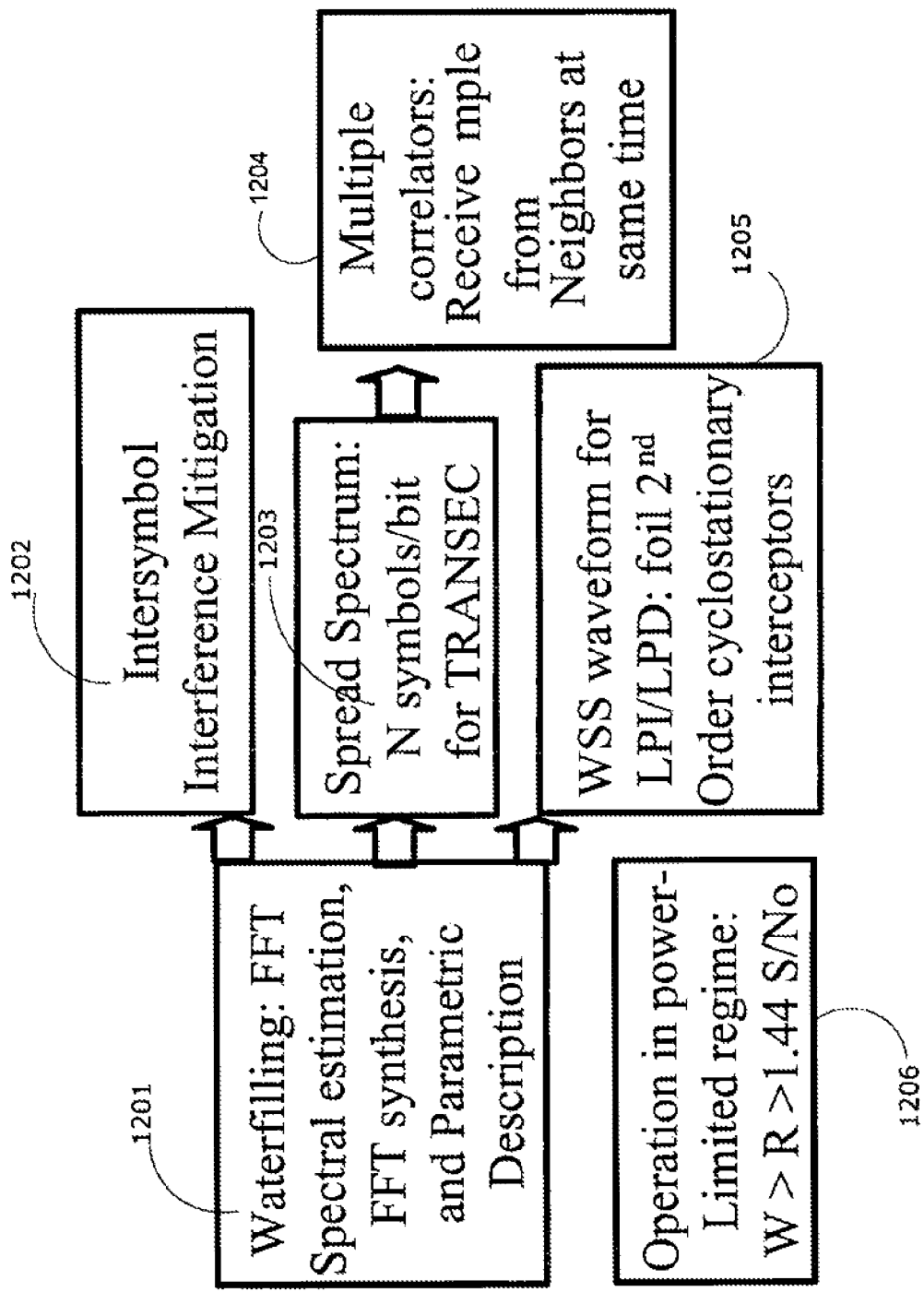
FIG. 12 depicts a model illustrating an integrated system concept according to an embodiment of the present invention.

FIG. 12 depicts a model illustrating an integrated system concept according to an embodiment of the present invention. As shown in FIG. 12, the present invention uses water-filling (represented by the component designated 1201) for each node to create its optimal short-term receiving waveform for use by all of its neighbors to communicate with it. The resulting spectrum is nonuniform and covers disjoint frequencies. As a result, the time domain version of this waveform (a basic symbol on the channel) will be far more complicated than the sin(t)/t pulse generated by a brick wall frequency domain specification. In the following, a number of techniques for achieving very desirable waveform characteristics are presented. These techniques, which will be described in more detail below, include using: Intersymbol Interference Mitigation (component 1202); Spread Spectrum Transmissions (component 1203); Multiple Correlators (component 1204); and Wide Sense Stationary (WSS) Baseband Signals and Modulation (component 1205). When used in conjunction with operating nodes in a Power-Limited Regime (component 1206), these techniques provide a comprehensive spectrum reuse system that is far more efficient than any of the existing or proposed systems.

Intersymbol Interference Mitigation

The power spectrum derived from the statistical noise floor characterization described above is a crenelated structure with fragmented frequency support. The first challenge was to transmit a sequence of basic symbols with this power spectrum (modulated to carry user data) in a way that intersymbol interference is tolerable. Obviously, spacing the symbols far apart in time will reduce the intersymbol interference, at the cost of greatly reducing the data rate.

Figure 13:
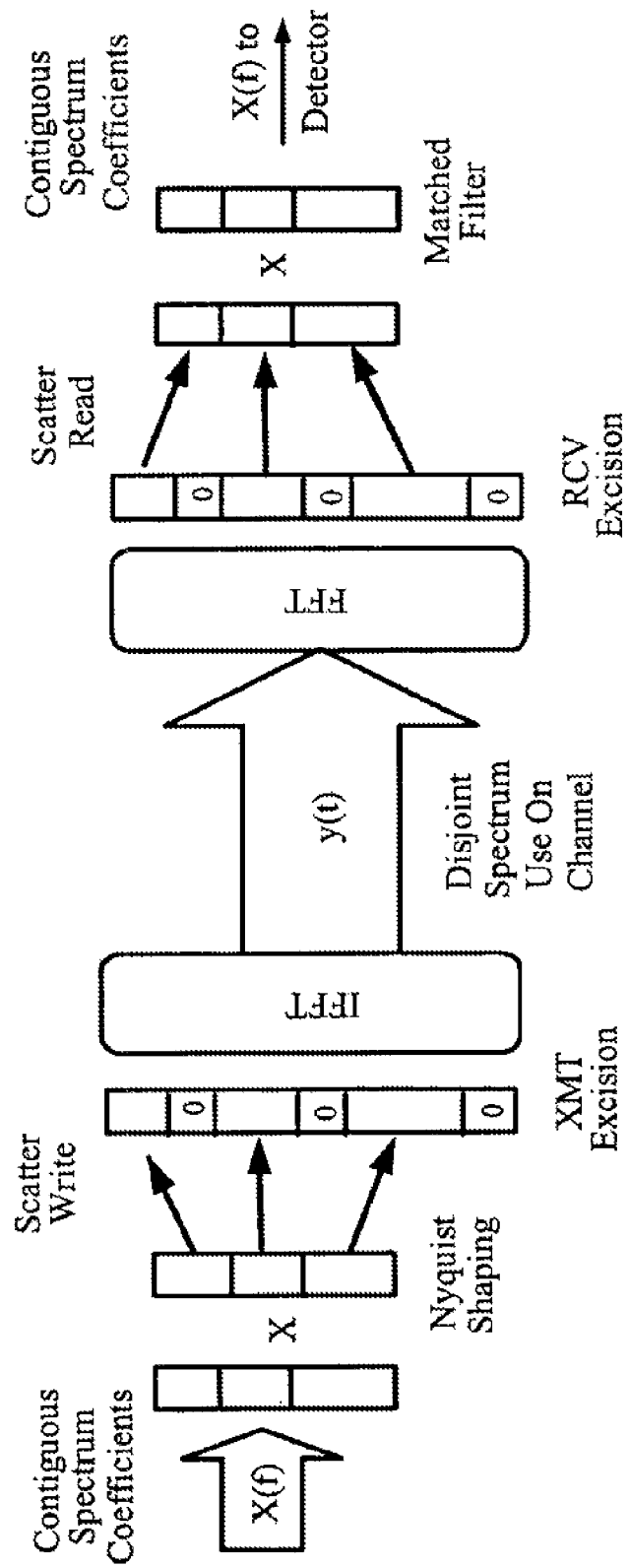
FIG. 13 illustrates one approach, in accordance with the principles of the present invention, to mitigating intersymbol interference.

An alternative approach is shown in FIG. 13. Here, the desired waveform is specified as a contiguous vector of complex Fourier coefficients X(f), with constant amplitude and some phase structure. X(f) is the set of the coefficients to be transmitted over the channel, expressed as the complex value of each frequency bin of a complex waveform (as would result from a fast Fourier transform (FFT)). This frequency vector is then expanded to a wider bandwidth that has zeroes in the ranges where the spectrum estimator has judged that interfering signals are present. This wider band frequency vector is then inverse-FFT'ed into a time waveform for transmission across the channel. The symbol rate on the channel is higher, corresponding to the expanded bandwidth of this vector. Y(t) is the signal sent over the channel, which has the wider bandwidth. The undesired frequencies have been removed from y(t) by the transmit excision.

On the receive side (toward the right-most side of FIG. 13), the receiver does a matching FFT, "squeezes out" the undesirable frequencies (accomplishing receive excision), and then multiplies the frequency vector by the characteristic matched filter (with phases opposite to the original signal in each frequency bin) to produce the signal to be detected at the original symbol rate. The core structure (IFFT, channel, FFT) corresponds to OFDM modulation recently commercialized in IEEE 802.11a and 802.11g wireless LANs. Of course, the remaining structure (a spectrum shaping appliqué) is unique to XG. A Nyquist shaper (satisfying the Nyquist criterion for zero intersymbol interference) algorithm permits finite length symbols with no intersymbol interference, in spite of the use of noncontiguous spectrum. Thus, X(f) on the receiver side is a reconstruction of the original set of frequency coefficients with the same name at the sender. The user symbol rate matches the bandwidth of this frequency domain specification X(f).

CDMA w/Multiple Correlators—White Signals

Some throughput may be lost due to spreading (processing gain). By using multiple code division multiple access (CDMA) correlators at each receiver to permit multiple neighbors to send to the node at the same time, some of the throughput lost to spreading can be recovered. Examples of multi-correlator systems that exchange information with multiple nodes simultaneously include GPS (receiving from up to 12 satellites) and IS-95 CDMA downlink (sending to up to 64 cell phones). The present invention uses multiple waveforms (e.g., with differing phase structure) that all have the optimal PSD and have a small, tolerable level of mutual interference. For typical mobile ad hoc networks, nodes usually have 4 to 6 neighbors, so that is a reasonable estimate of the number of correlators needed, and thus the throughput factor that can be recovered from the spreading loss.

To achieve high performance CDMA, the present invention uses white waveforms (those having constant power spectrum density at the detector) with pseudorandom phase structure. A waveform of this type can be used to provide a signal that approximates a Gaussian envelope to improve LPI/LPD, while providing orthogonal CDMA for minimal interference among multiple simultaneous transmissions to the destination node.

Unlike the COMA cell towers, the present invention uses small, light transceivers with small antenna structures, so the transceivers will only be able to operate in wideband half duplex, not full duplex, mode. This means that each node will alternate between a state of receiving from N neighbors simultaneously, and a state of transmitting either to one neighbor, or to N neighbors simultaneously when this doesn't require an impractical dynamic range. This requires MAC protocol that is quite different from conventional carrier sense multiple access/Collision detect (CSMA/CD) protocols, such as IEEE 802.11, which uses RTS/CTS exchanges. The basic rule in the multi-correlator architecture of the present invention is to transmit traffic to any neighbors that aren't currently transmitting. This approach provides another opportunity to use "Opportunistic Forwarding", as described above. For extremely low delay traffic, packets are forwarded to any node in the direction of the destination (lower hop count) that is not currently transmitting (like a soccer player looking for an open team mate downfield). This violates the customary practice of strict protocol layering, by using instantaneous information from the MAC layer to guide network forwarding decisions. It minimizes the dominant end-to-end latency effect of channel access delay at each hop, providing far lower network latency for critical real time traffic.

The invention also uses orthogonal CDMA waveforms, as well as that of the multi-correlator MAC protocol, described above, to achieve optimal performance.

LPI/LPD: Wide Sense Stationary Baseband Signal and Modulation

The present invention generates a waveform with the optimal PSD that enhances LPI/LPD capability. In some applications, it is important to generate a wide sense stationary (WSS) water-filling waveform that minimizes features susceptible to intercept by a second order cyclo-stationary interceptor. Wide sense stationarity requires that all second order statistics of the signal are constant functions of time, meaning that the expected value of the signal (mean) is constant (chosen to be zero), and the expected variance (mean power) and the autocorrelation function are also constant functions of time. Specialized filtering and linear modulation architecture may be used to eliminate any spectral redundancy (nonlinear constant envelope and continuous phase modulations are easily susceptible to second order cyclostationary intercept). This symbol generation and modulation structure involves Nyquist filtering of the symbols (limiting symbol frequencies to $1/(2T)$, where T is the symbol period on the channel), to produce constant mean power signaling, and to prevent exposure of the symbol clock by a magnitude-square operation.

In addition, the symbols are modulated onto a carrier using uncorrelated I and Q channels with equal mean power to prevent exposure of the doubled carrier frequency by a squaring operator. Making I and Q uncorrelated may be accomplished either by sending uncorrelated data on each channel, or by making Q the Hilbert transform of I, resulting in single sideband modulation of the carrier. Hilbert transforms are described in A. Papoulis, Probability, Random Variables, and Stochastic Processes, McGraw Hill 1991, which is incorporated herein by reference in its entirety.

Use of Power Limited Signals for Spectrum Compatibility and LPI/LPD: (Data Rate<<Bandwidth, Eb~No)

In preferred embodiments of the present invention, network links are operated in the power limited regime (transmitting far less than one bps per Hz), rather than the conventional bandwidth limited regime (with more than one bps per Hz), which requires high SNR (e.g. >10 dB for 10-5 BER with QPSK). At the cost of lower data rates, this capability, along with closed loop power control on each link, will permit an entire network to operate in LPI/LPD mode. Using wide bandwidths and low power also greatly enhances the spectrum compatibility among multiple XG users and legacy users.

Preferably, the optimal water-filling waveforms produced by the above-described methods are used in a spread spectrum mode, where the user bit rate is roughly an order of magnitude less than the basic symbol rate. Spectrum spreading improves LPI/LPD and interference performance by a factor of the processing gain, at the cost of a reduced user data rate. The recently introduced Turbo-Hadamard codes, which provide very low rate (e.g. rate 1/8 or 1/16) forward error correction (FEC) coding, may be used to address this problem. A rate of 1/8 or 1/16 means that one user bit turns into 8 or 16 bits with forward error correction on the channel. These codes have been demonstrated to operate with 10-5 BER down to Eb/No ratios below 0 dB at the detector, which is close to the ultimate Shannon bound of Eb/No=−1.6 dB. With this approach, spectrum spreading and FEC are combined into a single operation. Operation at such low Eb/No ratios provides LPI/LPD and excellent spectrum compatibility with other users. The spread spectrum (e.g., an order of magnitude greater bandwidth than the data rate) permits resolving multipath components in the time domain, perhaps even power combining the energy of the different multipath components in a rake receiver.

Figure 14:
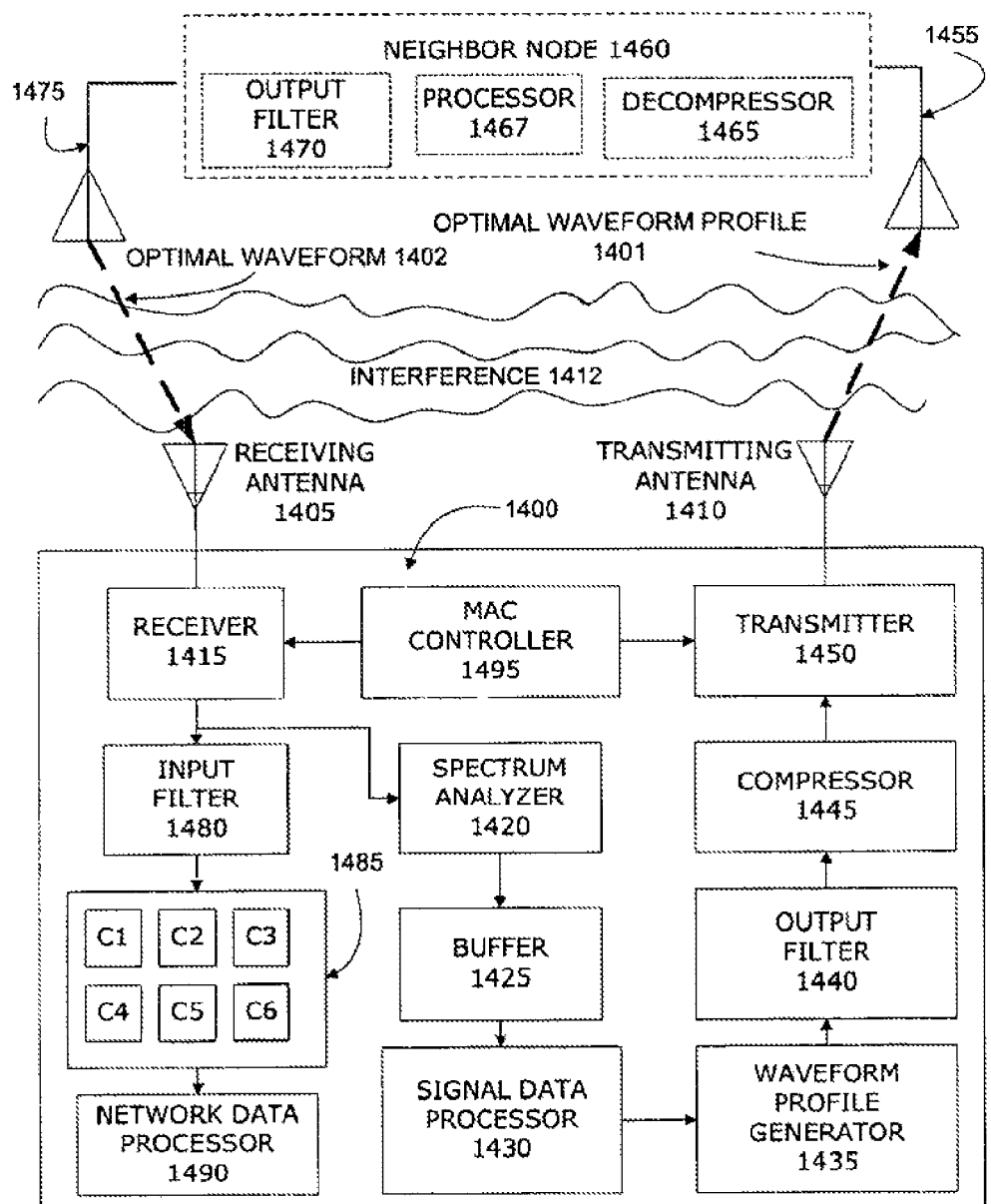
FIG. 14 shows a high-level block diagram of a network node 1400 (such as a software radio, a router, etc.) configured to operate according to embodiments of the present invention.

FIG. 14 shows a high-level block diagram of a network node 1400 (such as a software radio, a router, etc.) configured to operate according to embodiments of the present invention. As shown in FIG. 14, node 1400 comprises a receiving antenna 1405, a transmitting antenna 1410, a receiver 1415, an input filter 1480, multiple correlators 1485, a network data processor 1490, a MAC controller 1495, a spectrum analyzer 1420, a buffer 1425, a signal data processor 1430, a transmitter 1450, a compressor 1445, an output filter 1440 and a waveform profile generator 1435.

Receiver 1415 continuously monitors and receives aggregate signals from the networking environment. When a signal is received, receiver 1415 passes the signal to spectrum analyzer 1420, which is configured to continuously measure power in all the frequencies contained in a frequency band of interest. The output from spectrum analyzer 1420 is a series of power values as a function of frequency. Typically, although not necessarily, spectrum analyzer 1420 would store multiple power functions in a buffer 1425, which is coupled to a signal data processor 1430 configured to create a model or "normalized" power function, such as by computing the average or median power reading at each frequency in the band of interest over a given period of time. Signal data processor 1430 conveys the model power function to waveform profile generator 1435, which, in preferred embodiments, is configured to subtract the model power function from a specified interference temperature, limit or threshold, in order generate an optimal waveform profile that specifies which frequency neighboring nodes should use to communicate with node 1400. More particularly, waveform profile generator 1435 produces an optimal waveform profile 1401 that requires neighboring nodes communicating with node 1400 to use zero power at frequencies node 1400 has determined are already populated with signals generated by legacy communication devices in the network.

Output filter 1440 conforms the optimal waveform profile created by waveform profile generator 1435 to a format that will be understood by neighboring node 1460. In other words, output filter 1440 performs transmit excision to remove power from certain frequencies that neighboring node 1460 has determined should not be used because those frequencies are carrying data signals from primary users (e.g., legacy and high-priority users, such as police, governmental or military entities). Optionally, node 1400 includes a compressor 1445, which may be implemented in hardware, software, or both, which compresses the optimal waveform profile 1401 prior to sending it to neighboring node 1460 via transmitter 1450 and antenna 1410. In a preferred embodiment, node 1400 would also provide feedback information to neighboring node 1460 to assure that the signal neighboring node 1460 sends back to node 1400 arrives with the same power level as that of every other neighbor, minimizing problems of near-far receiver masking.

Neighboring node 1460 typically comprises substantially the same components as node 1400. For simplicity's sake, however, neighboring node 1460 is shown in FIG. 14 as being comprised of a processor 1467, decompressor 1465, output filter 1470, receiving antenna 1455 and transmitting antenna 1475. Neighboring node 1460 receives the signal containing the optimal waveform profile 1401 from node 1400 via antenna 1455. If the signal containing optimal waveform profile 1401 is compressed, decompressor 1465 of neighboring node 1460 decompresses the signal before passing it along to processor 1467. Processor 1467 is configured, in conjunction with output filter 1470, to use the optimal waveform profile 1401 to generate and send a new signal (optimal waveform 1402) conforming to the optimal waveform profile 1401 when transmitting data to node 1400. In other words, the signal has been filtered such that there is no power transmitted at the frequencies waveform profile generator 1435 determined carried signals from legacy transmission devices.

Neighboring node 1460 transmits information back to node 1400 in the form of the optimal waveform 1402 via transmitting antenna 1475. Notably, nodes 1400 and neighboring node 1460 may or may not use a single antenna to perform both the transmit and receive functions. During this transmission, optimal waveform 1402 may be influenced and/or partially contaminated by interference 1412 produced by other emitters (e.g., legacy transmitting devices) existing in the wireless networking environment.

When the signal carrying optimal waveform 1402 (combined with noise and interference produced from interference 1412) is received at node 1400 via antenna 1405 and receiver 1415, it will again be passed to spectrum analyzer 1420 for analysis and generation of an "updated" optimal waveform profile that takes into account changes in the wireless communication environment that may have occurred since the last optimal waveform profile was generated. Such changes in the wireless communication environment might occur, for example, due to a change in the physical location of node 1400 or other mobile nodes in the network, or by new emitters coming online in the vicinity of node 1400.

Receiver 1415 also passes the incoming signal to input filter 1480 (preferably, an optimal matched filter), which is configured to zero out (or ignore) any power carried at frequencies node 1400 previously determined were occupied by signals produced by legacy systems. In other words, input filter 1480 performs receiver excision because it is configured to be most sensitive where the optimal waveform profile 1401 requires there to be power, and completely insensitive to power signals carried on frequencies where the optimal waveform profile 1401 for node 1400 requires there to be no signal. In this way, input filter 1480 removes the noise and interference caused by interference 1412.

Input filter 1480 passes the filtered signal to a set of multiple correlators 1485 (containing correlators C1 through CN), each of which is configured to respond to unique patterns associated with one or more neighboring nodes in the vicinity of node 1400. Using multiple correlators in this manner allows node 1400 to receive from multiple neighboring nodes simultaneously. Once the incoming signal has been filtered by input filter 1480 and its source has been identified by multiple correlators 1485, it is then passed on to network data processor 1490 for processing of the data carried by the signal, according to the specific requirements, applications and/or networking protocols associated with node 1400 and the wireless communications network in general.

As discussed above, node 1400 is configured to operate in half-duplex mode, meaning that it is always in either transmit mode or receive mode, but not both at the same time. Accordingly, node 1400 also includes a media access controller (designated MAC controller 1495 in FIG. 14), which is responsible for switching node 1400 back and forth between receive mode and transmit mode. When node 1400 is operating in receive mode, it is capable of receiving multiple signals from multiple neighboring nodes, each of which uses the optimal waveform 1402, as defined by node 1400 and transmitted to those neighboring nodes. Node 1400 identifies the source of those signals using correlators C1 through CN (designated 1485 in FIG. 14).

In alternative embodiments, node 1400 may be configured to use a common, low data rate configuration channel to transmit waveform profile 1401 to neighboring node 1460.

Although the example node shown in FIG. 14 and discussed in detail above shows components, such as processors, controllers, generators, antennas, filters and buffers, as separate physical components residing at node 1400, those skilled in the art would recognize and appreciate the fact that the invention may be advantageously combined or divided, depending on the needs of the particular implementation, into more or fewer processors, controllers, generators, antennas, filters and buffers than the number shown in the embodiment of FIG. 14, and that such components do not necessarily have to reside at each of the nodes in the network. It should be apparent, for example, that, although the example node in FIG. 14 shows two separate antennas for clarity, network nodes typically use only a single antenna for both transmit and receive modes. Accordingly, such alternative configurations are not meant to fall outside the scope of the claimed invention.

Figure 15:
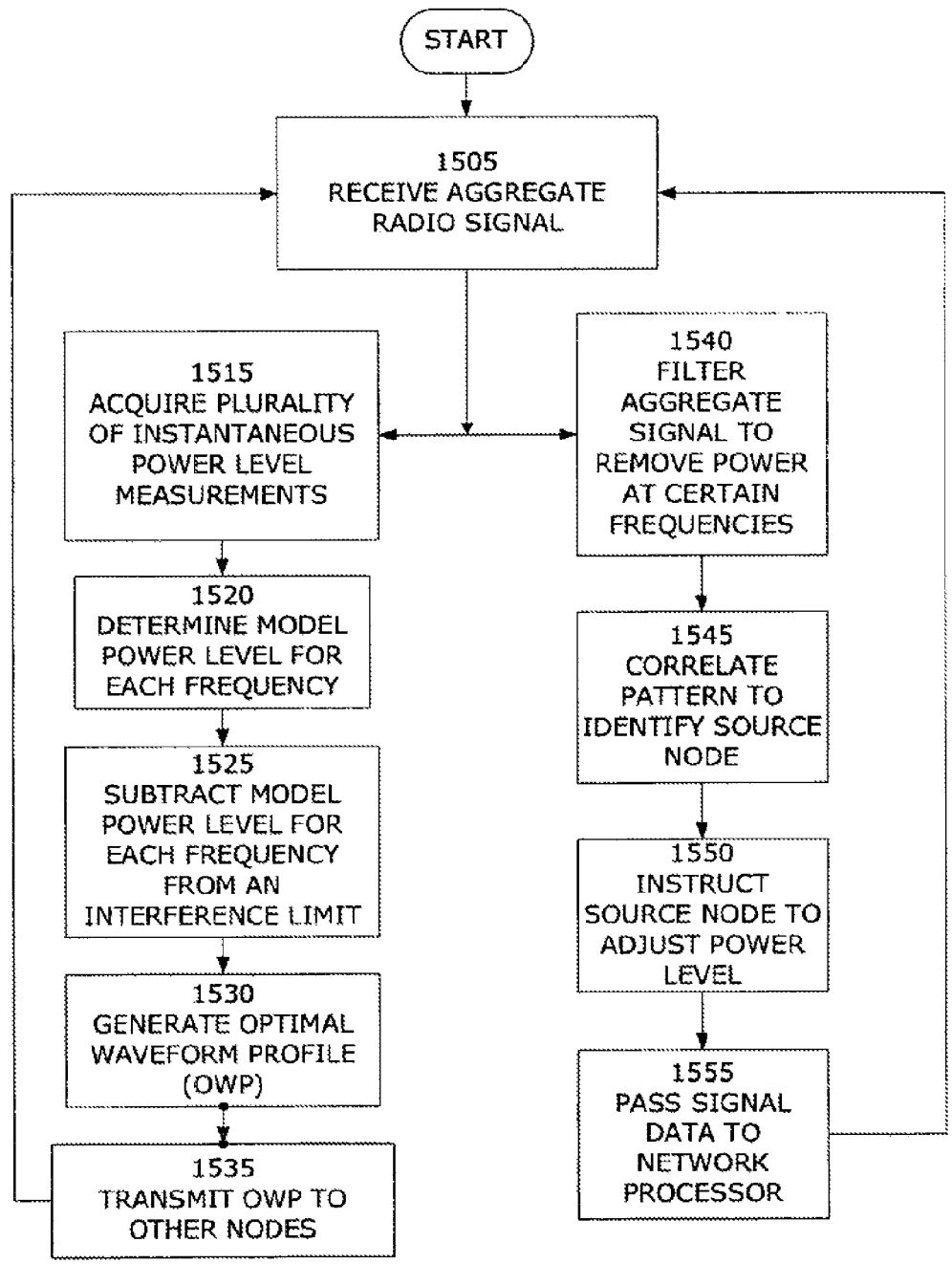
FIG. 15 contains a high-level flow diagram illustrating the steps performed in an embodiment of the present invention in order to process signals and manage interference received at a node, such as the node shown in FIG. 14.

FIG. 15 contains a high-level flow diagram illustrating the steps performed in an embodiment of the present invention in order to process signals and manage interference received at a node, such as node 1400 described above with reference to FIG. 14. Beginning at step 1505, the node receives an aggregate radio signal available at the receiving node. When a signal is received, the system passes the signal through two parallel processing chains.

The first processing chain, depicted on the left side of FIG. 15, comprises steps 1515, 1520, 1525, 1530 and 1535. In step 1515, a plurality of instantaneous power measurements over a given length of time are acquired for each frequency in a band of interest and, in some embodiments, stored in a buffer as shown in FIG. 14. Next, at step 1520, the system determines a model power level based on the plurality of power levels acquired in step 1515. Such model power level may be determined, for example, by calculating the average or median power level at each frequency during the period of time. The model power level at each frequency is then subtracted from an interference limit, step 1525. The interference limit may be specified by a government agency, a rule-making body an industry standard and/or some combination of all of them.

The difference between the interference limit and the model power level, which represents the amount of power spectrum available for use by next generation systems, is used, at step 1530, to generate an optimal waveform profile (OWP) for the receiving node to receive transmissions from a neighboring node. The optimal waveform profile requires that certain frequencies will not be used to communicate with this node because using those frequencies will interfere with legacy and primary users communicating in the band of interest. At step 1535, the optimal waveform profile (OWP) is transmitted to other nodes in the network. At this point, control returns to step 1505 where the system again receives the aggregate signal available at the receiving node.

While the optimal waveform profile (OWP) is being calculated, generated and reported to other nodes in steps 1525, 1530 and 1535, the received aggregate signal is also examined in a parallel chain of steps (steps 1540, 1545, 1550 and 1555 in FIG. 15) to determine whether the signal contains data sent specifically to this node from another specific node in the network. At step 1540, for instance, the aggregate signal is filtered, such as by an optimal matched filter, to remove all power carried on frequencies corresponding to transmissions by legacy and primary users. These frequencies are the same frequencies specified for avoidance by the optimal waveform profile (OWP) generated in step 1530. Next, at step 1545, the filtered signal is correlated to identify a source for the transmission by determining whether it contains a unique pattern associated with a particular node in the network.

If a particular node is identified as the source of the transmitted and received signal, the system may optionally instruct that node to adjust the power level on its transmission (step 1550) so as not to overwhelm other nodes in the immediate vicinity. At step 1555, the signal data is passed to a network processor for further processing in accordance with the requirements of various applications and protocols, and control passes, once again, back to step 1505, where the system continues to receive an aggregate signal.

Clustering of Nodes to Manage the Large Dynamic Range of RF Links in a Mobile Wireless Network.

Typical mobile networks have RF links that have a path loss (PL) range of 60-120 dB. This corresponds to a line-of-sight range variation (with $r^2$ loss) of 1000 to 1, or ground mobile range variations (with $r^4$ loss) of about 30 to 1. Co-site interference limits overall network performance because (high power) transmission to a distant receiver "deafens" all nearby receivers. This 60 dB dynamic range of path loss is beyond the normal power control and spurious-free dynamic range (SFDR) capabilities of typical RF transceivers.

In a preferred embodiment of the present invention, co-site interference may be addressed by dividing the available spectrum into two bands, with simultaneously operating, non-interfering half duplex transceivers on each. One set of transceivers is used within automatically formed short-range clusters, e.g., nodes with 60-90 dB PL to their neighbors within a cluster (intra-cluster communications). The other set of transceivers are configured to operate over considerably longer paths (PLs in the 90-120 dB range), using far greater transmitter power, to provide inter-cluster communications. Factoring the spectrum into two bands with greatly differing path loss capabilities is one way of reducing the dynamic range required of any single transceiver to a range that is much easier to manage (e.g., 30 dB).

A manager for each cluster is automatically selected, e.g., by using a K-means (position vector quantization) algorithm. The manager provides a point coordination function that controls use of any inter-cluster link. The manager is accessed over the intra-cluster links, and grants only serialized access to use an inter-cluster link. Traffic need not flow through the manager, only the channel access permission for use of the inter-cluster links. This eliminates co-site interference within each cluster, by assuring that, at most, one long range transceiver is transmitting at a time within each cluster.

Multiple CDMA correlators may be used in each short-range transceiver, and a different CDMA transmission code assigned for each neighbor. Thus, a node can receive from multiple neighbors at the same time, as long as it is not transmitting. The ability to receive from multiple neighbors simultaneously on each band recovers some of the bandwidth lost to the CDMA code's spectrum spreading. Simultaneous CDMA reception from multiple neighbors is enhanced by using closed loop power control from each neighbor (e.g., over a 30 dB dynamic range) to assure that equal power arrives at the receiver from each neighbor.

In preferred embodiments, each correlator provides "carrier sense" to indicate when a particular neighbor is transmitting. The node alternates between modes of transmitting to a single neighbor, or receiving from multiple neighbors. When no outgoing traffic is queued to a neighbor that is not currently transmitting, the node switches to receiving mode. When outgoing traffic is queued and no neighbor is transmitting to this node, the node switches to transmit mode. The same type of multi-correlator operation may be used for the long-range transceivers to improve their aggregate reception data rates as well.

Co-site interference may also be minimized by giving each node its own receive frequency. Under this scheme, transmit frequency is changed on a packet-by-packet basis to send each packet to the appropriate neighbor node on the neighboring node's own receive frequency. This permits a node to transmit out of one directional antenna (on the appropriate transmit frequency, i.e., the neighbor's receive frequency), while simultaneously receiving through multiple other directional antennas, pointed in other directions, on this node's own receive frequency. The benefits of simultaneous transmit and receive include both higher network throughput, and lower end-to-end latency for real time traffic.

A problem arises, however, when there are a multiplicity of nodes in a network and each node uses directional antennas to transmit and receive at the same time. Suppose, for example, the node comprises a moving vehicle equipped with multiple directional antennas, one on each side of the vehicle. The directional antennas usually do not provide enough signal separation to use the same frequency to broadcast on one side of the vehicle while receiving on the opposite side. The transmitting antenna will simply overwhelm the receiving antenna. For this reason, the transceivers on each node (or, in this case, each vehicle) in the network may be configured to have its own unique receive frequency and alternate between transmit and receive modes. While the node is in receive mode, and not transmitting, it will pick up any signal on its assigned frequency.

In some networks, there is simply not enough spectrum available to allocate a unique receive frequency to every node in the network. The present invention addresses this problem by assigning a small number of receive frequencies to nodes in such a way that nodes using the same receive frequency are far enough apart so that they do not pick up each other's transmissions. In other words, adjacent nodes are never assigned the same frequency.

Figure 16:
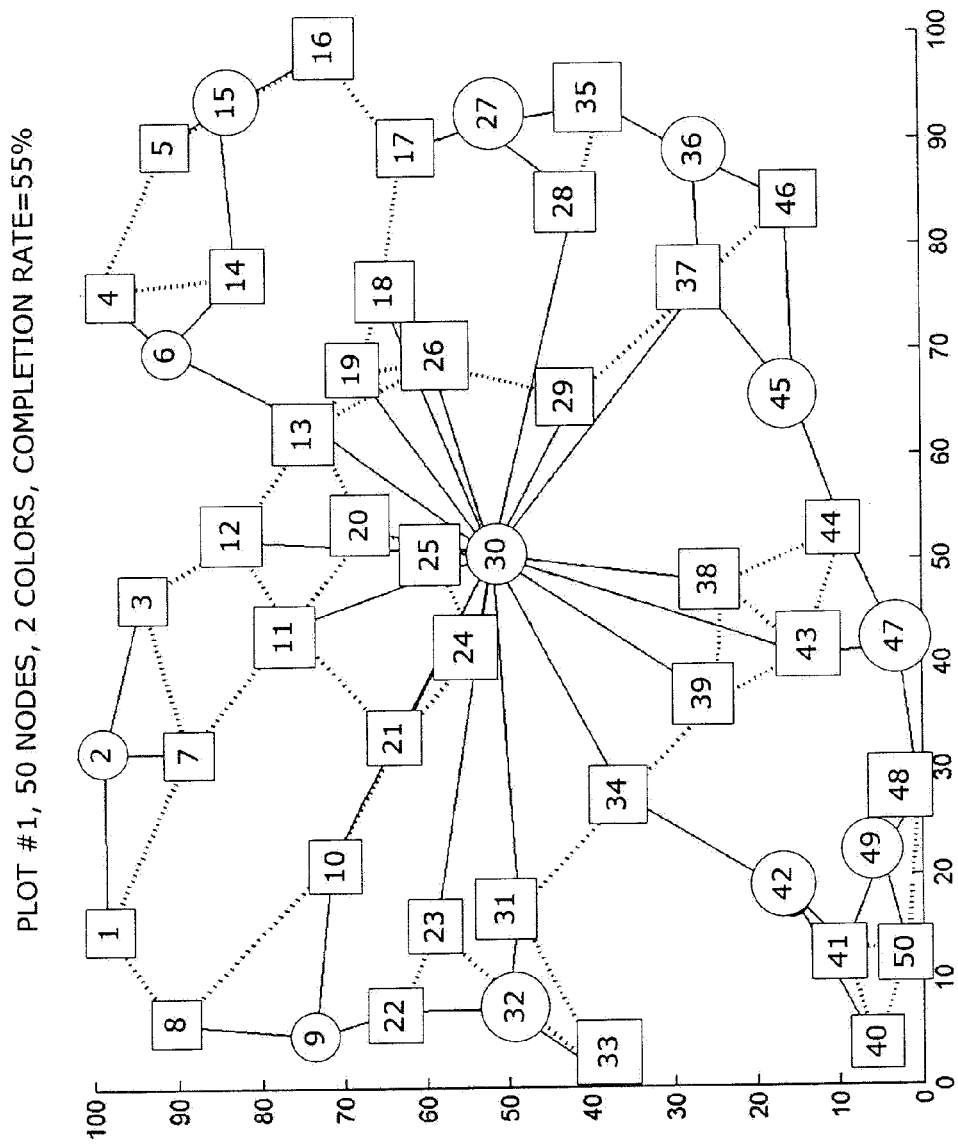
FIGS. 16, 17 and 18 show the results of simulation experiments for coloring (assigning different frequencies) a random layout of fifty nodes in a network.
Figure 17:
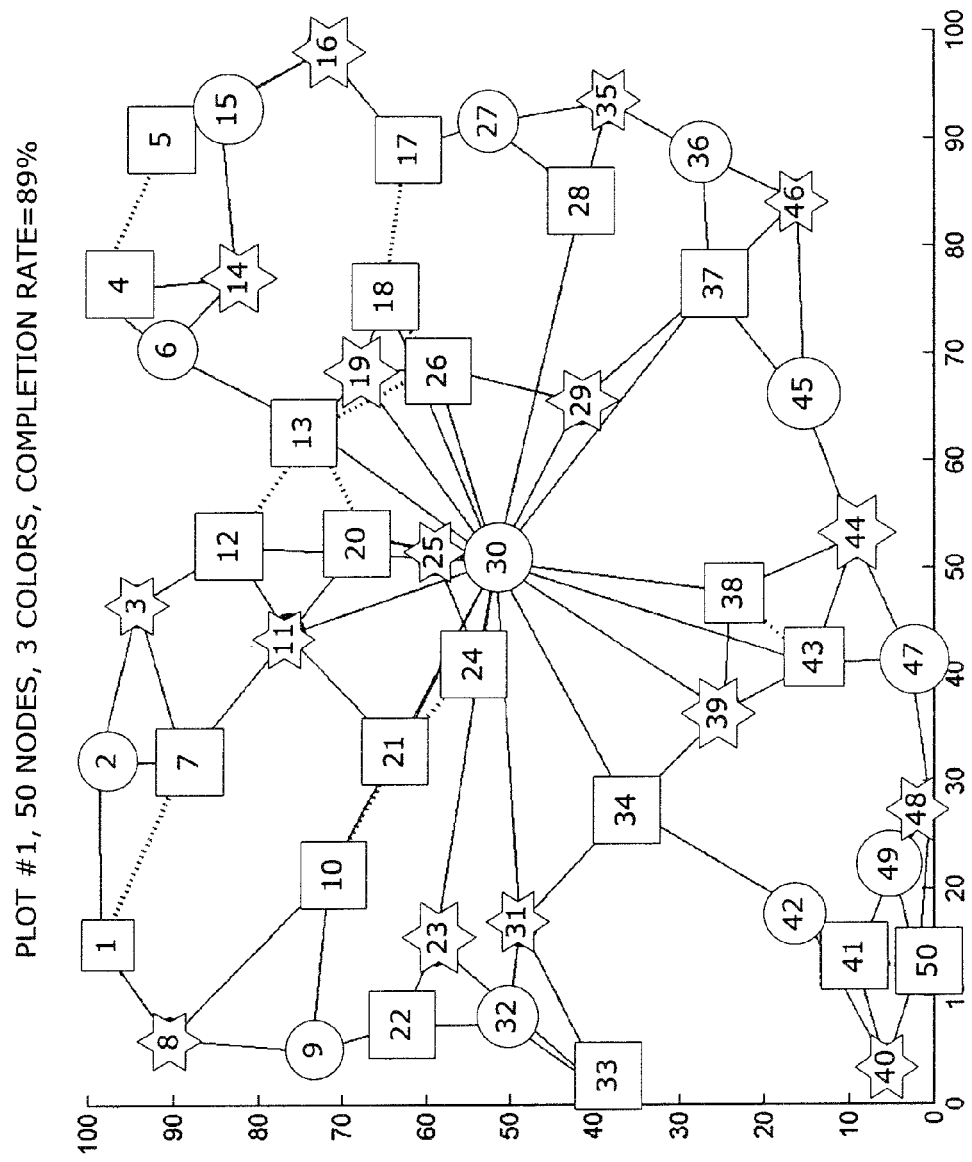
Figure 18:
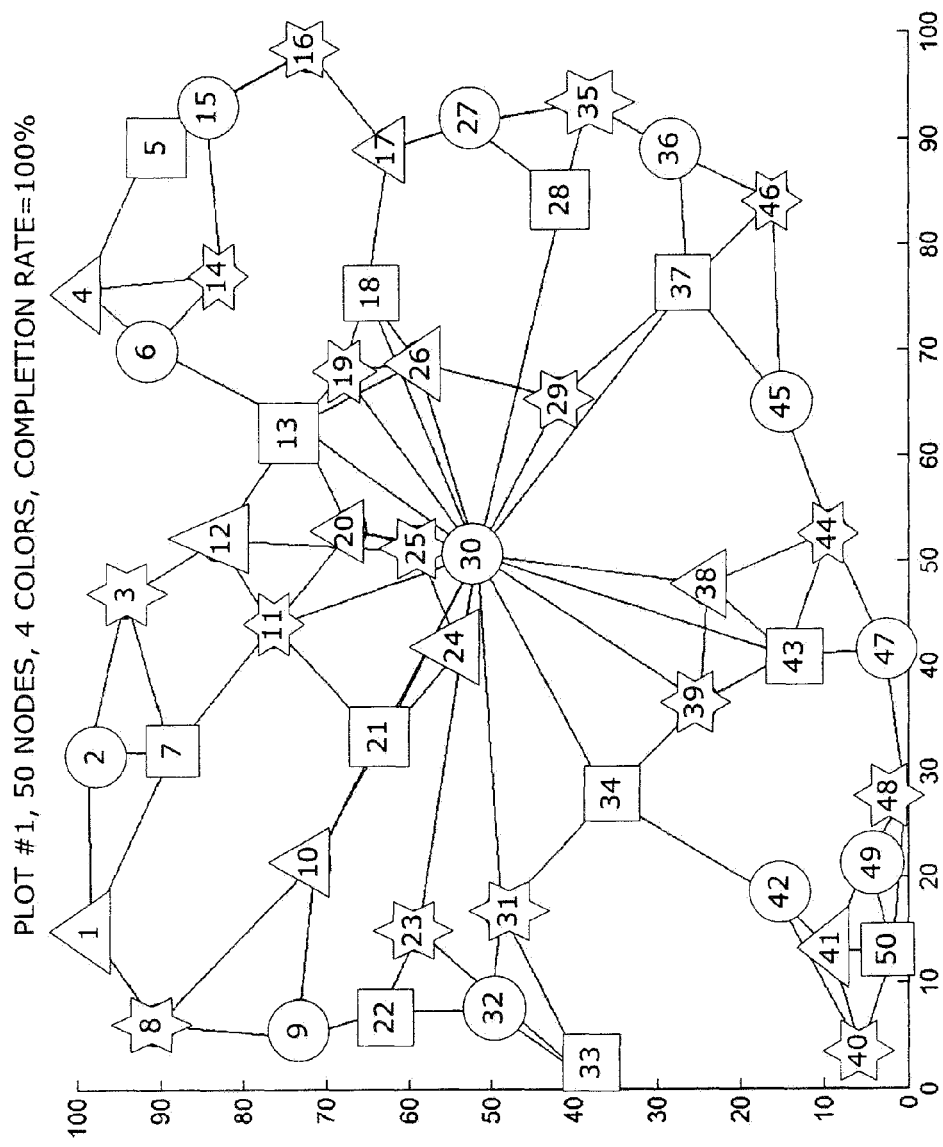

FIGS. 16, 17 and 18 show the results of simulation experiments for assigning different frequencies (sometimes referred to as "coloring") a random layout of fifty nodes in a network. First, as shown in FIG. 16, an attempt was made to assign frequencies to all 50 nodes using only two frequencies. In FIG. 16, the first frequency is represented by the squares and the second frequency is represented by the circles. If a link connects two nodes having the same frequency (shape), then that link is deemed to be unusable because it means those two nodes are sharing the same receive frequency. As FIG. 16 shows, it is not possible to assign one of the two frequencies (i.e., one of the two shapes) to all 50 nodes in such a way that there are no links connecting the same shape. Links connecting the same shape are shown as dotted lines in FIG. 16. So, for example, as shown in FIG. 16, the links between nodes 1 and 7, nodes 7 and 11, nodes 11 and 21, nodes 11 and 12, nodes 13 and 3, etc., are all unusable links. In this case, only 55% of the links in FIG. 16 are usable.

FIG. 17 shows the results of attempting to assign receive frequencies to the same set of nodes using three different frequencies (shapes) instead of two. Thus, a new frequency (represented by the star shape in FIG. 17) is available to use at different nodes as assigned receive frequencies. As can be seen in FIG. 17, after all of the nodes have been assigned one of the three available receive frequencies (shape), more of the links (89%) are usable than occurred with two frequencies (shapes). However, there are still a number of unusable links between nodes having the same frequencies (e.g., links connecting nodes 1 and 7, nodes 4 and 5, nodes 12 and 13, etc).

FIG. 18 shows the results of attempting to assign receive frequencies (shapes) to the same set of 50 nodes using four frequencies (shapes) instead of three. Thus, a fourth frequency (represented in FIG. 18 by the triangle shape) is now available to assign to nodes. Having four different frequencies (i.e., four different shapes) to assign to the fifty nodes makes it possible to have no adjacent nodes with the same frequency (or same shape). Thus, 100% of the nodes are connected by usable links. This being the case, there should be enough physical separation between nodes using the same receive frequency to transmit and receive simultaneously without experiencing harmful interference.

Figure 19:
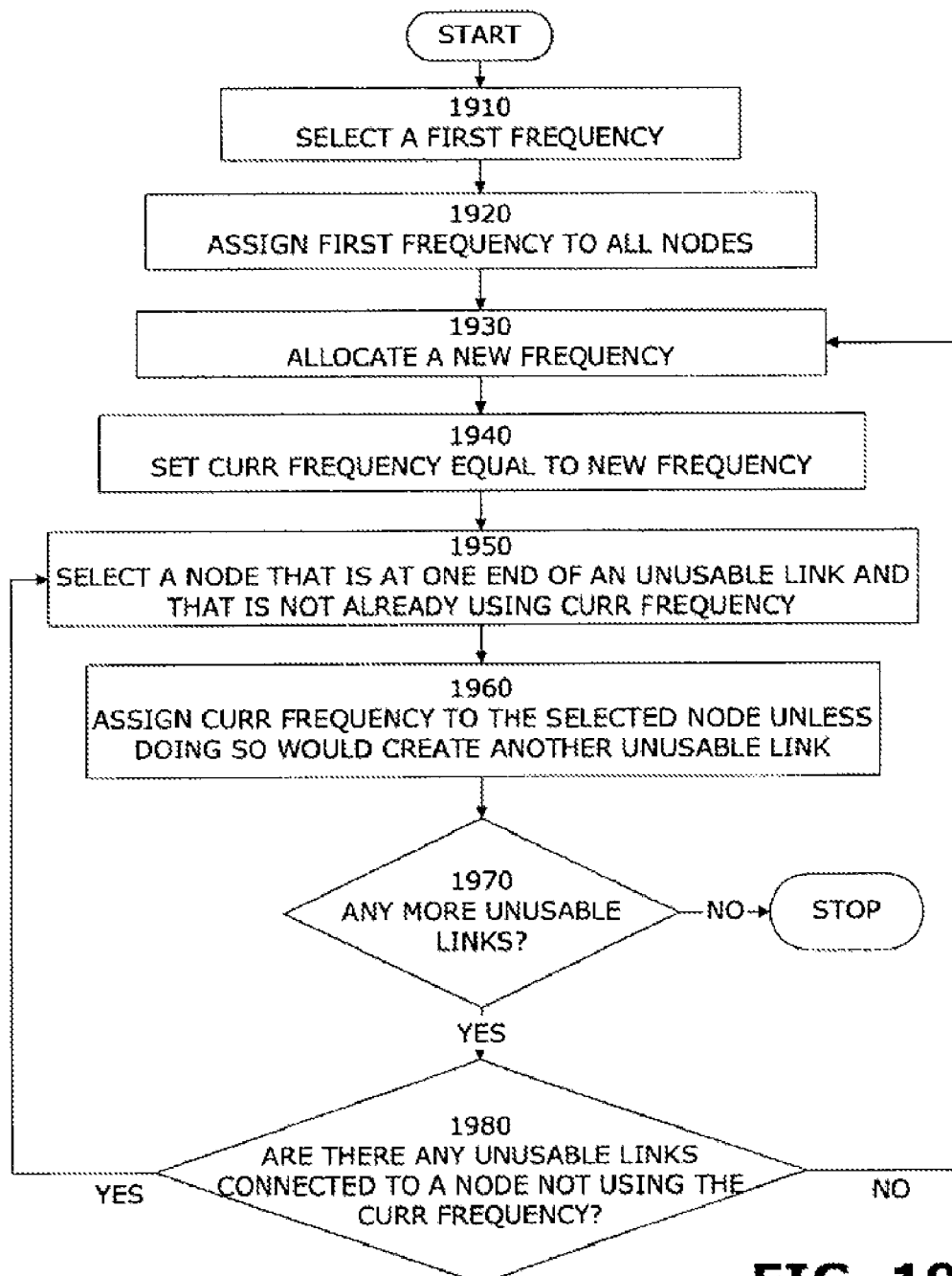
FIG. 19 shows a high-level flow diagram illustrating the steps that may be performed by a processor configured to assign receive frequencies to a multiplicity of nodes, in accordance with the present invention, to ensure that there are no adjacent nodes that use the same receive frequency.

FIG. 19 shows a high-level flow diagram illustrating the steps that may be performed by a processor configured to assign receive frequencies to a multiplicity of nodes in accordance with the present invention, to ensure that there are no adjacent nodes that use the same receive frequency. Links that are connected to nodes having the same receive frequency are unusable. As shown in FIG. 19, the first steps, step 1910 and 1920, are to select a first receive frequency and assign it to all of the nodes in the network. Next, a new frequency (receive frequency number two) is allocated, step 1930, and made the current frequency (using the variable "curr_frequency") at step 1940.

Next, in step 1950, a node that is at one end of an unusable link and that is not already using the current frequency is selected. The current frequency is assigned as the receive frequency for the selected node unless doing so would create another unusable link in the network. See step 1960. In the next step, step 1970, the system checks to see if there are any more unusable links. If the answer is no, processing stops because all links are now usable and there is no need to proceed any further. However, if it is determined at step 1970 that unusable links still exist, then the next step, step 1980, is to determine whether any of the unusable links are connected to a node not already using the current color. If the answer is yes, then processing returns to steps 1950 and then 1960, wherein that node is selected and assigned the current frequency unless doing so would create another unusable link. If, on the other hand, it is determined at step 1980 that none of the unusable links are connected to a node not using the current frequency, then processing returns again to step 1930, where another frequency must be allocated and then assigned to nodes connected to unusable links until either all links become usable or no other nodes can be assigned the newly allocated frequency.

The above-described embodiments are by no means meant to limit the scope of the invention. Though the invention has been described with respect to preferred embodiments thereof, many variations and modifications will become apparent to those skilled in the art upon reading this disclosure and the following claims, as well as practicing the claimed invention. It is therefore the intention that the claims be interpreted as broadly as possible in view of the prior art, to include all such variations and modifications.

What is claimed is:

1. A method for managing co-site interference in a wireless network having a multiplicity of nodes, comprising the steps of:
   identifying a subset of nodes within the multiplicity of nodes, wherein each node in the subset is capable of transmitting data to each other node in the subset in accordance with a connectivity threshold and using a power setting that falls within a low power range;
   defining a collection of transmission frequencies to be used by nodes of the subset only when transmitting to a node outside of the subset; and permitting only one member of the subset at a time to transmit using any transmission frequency within the collection.

2. The method of claim 1, further comprising the step of serially allocating to the members of the subset permission to transmit using a transmission frequency within the collection.

3. The method of claim 2, wherein the serially allocating step is carried out using a point coordination function.

4. The method of claim 1, further comprising the step of defining a range of high power levels to be used by members of the subset while using a transmission frequency within the collection.

5. The method of claim 1, further comprising repeating the identifying step.

6. The method of claim 1, further comprising repeating the identifying step according to a schedule.

7. The method of claim 1, further comprising repeating the identifying step at regular intervals.

8. The method of claim 1, further comprising repeating the identifying step if a node in the multiplicity of nodes has changed locations.

9. The method of claim 1, wherein the identifying step is carried out using a K-Means vector quantization algorithm.

10. The method of claim 1, further comprising the steps of:
identifying a second subset of nodes within the multiplicity of nodes, wherein each node in the second subset is capable of transmitting data to each other node in the second subset in accordance with the connectivity threshold using a power setting that falls within a medium power range;
defining a second collection of transmission frequencies to be used by the nodes of the second subset to transmit using a power setting that falls outside the medium power range;
permitting only one node of the second subset at a time to transmit using any transmission frequency within the second collection.

11. The method of claim 10, further comprising the step of serially allocating to the members of the second subset permission to transmit using a transmission frequency within the second collection.

12. The method of claim 11, wherein the step of serially allocating is carried out using a point coordination function.

13. The method of claim 10, wherein the step of identifying a second subset is carried out using a K-Means vector quantization algorithm.

14. The method of claim 1, wherein all nodes in the subset are configured to receive transmissions on any transmission frequency in the collection while no node in the subset is transmitting on the any transmission frequency.

15. The method of claim 14, further comprising the steps of:
associating a defined waveform pattern with the subset of nodes; and
determining whether received transmissions contain the defined waveform pattern.

16. The method of claim 14, further comprising the steps of:
associating a unique spread spectrum code with the subset of nodes; and
determining whether received transmissions contain the spread spectrum code.

17. The method of claim 1, wherein the collection comprises a radio frequency band.

18. The method of claim 1, wherein the subset is configured as a wireless local area network.

19. The method of claim 1, wherein the subset is configured as a wireless metropolitan area network.

20. The method of claim 1, wherein the subset is configured as a wireless wide area network.

21. The method of claim 1, wherein the subset is configured as a wireless Intranet.

22. The method of claim 1, wherein the wireless network is the Internet.

23. A method for managing congestion at an elevated node in a wireless network having a multiplicity of nodes, comprising the steps of:
identifying a subset of nodes within the multiplicity of nodes, each node in the subset being capable of transmitting data to each other node in the subset in accordance with a connectivity threshold and using a power setting that falls within a low power range;
defining a collection of transmission frequencies to be used by nodes of the subset only when transmitting to the elevated node; and
permitting only one member of the subset at a time to transmit using any transmission frequency within the collection.

24. The method of claim 23, further comprising the step of serially allocating to the nodes of the subset permission to transmit using a transmission frequency within the collection.

25. The method of claim 24, wherein the step of serially allocating is carried out using a point coordination function.

26. The method of claim 23, further comprising the step of defining a range of high power levels to be used by nodes of the subset while using a transmission frequency within the collection.

27. The method of claim 23, further comprising repeating the identifying step.

28. The method of claim 23, further comprising repeating the identifying step according to a schedule.

29. The method of claim 23, further comprising repeating the identifying step at regular intervals.

30. The method of claim 23, further comprising repeating the identifying step if a node in the multiplicity of nodes has changed locations.

31. The method of claim 23, wherein the identifying step is carried out using a K-Means vector quantization algorithm.

32. The method of claim 23, wherein all nodes in the subset are configured to receive transmissions on any transmission frequency in the collection while no node in the subset is transmitting on the any transmission frequency.

33. The method of claim 32, further comprising the steps of:
associating a defined waveform pattern with the subset of nodes; and
determining whether received transmissions contain the defined waveform pattern.

34. The method of claim 32, further comprising the steps of:
associating a unique spread spectrum code with the subset of nodes; and
determining whether received transmissions contain the spread spectrum code.

35. The method of claim 23, wherein the collection comprises a radio frequency band.

36. The method of claim 23, wherein the subset is configured as a wireless local area network.

37. The method of claim 23, wherein the subset is configured as a wireless metropolitan area network.

38. The method of claim 23, wherein the subset is configured as a wireless wide area network.

39. The method of claim 23, wherein the subset is configured as a wireless Intranet.

40. The method of claim 23, wherein the wireless network is the Internet.

* * * * *